US011203278B2

(12) United States Patent
Cayzer

(10) Patent No.: US 11,203,278 B2
(45) Date of Patent: Dec. 21, 2021

(54) COLLAPSIBLE TRAVEL SUPPORT DEVICE

(71) Applicant: Jennifer Cayzer, Grafton (AU)

(72) Inventor: Jennifer Cayzer, Grafton (AU)

(73) Assignee: Jennifer Cayzer, Grafton (AU)

( * ) Notice: Subject to any disclaimer, the term of this patent is extended or adjusted under 35 U.S.C. 154(b) by 0 days.

(21) Appl. No.: 16/629,144

(22) PCT Filed: Jul. 11, 2018

(86) PCT No.: PCT/AU2018/050713
§ 371 (c)(1),
(2) Date: Jan. 7, 2020

(87) PCT Pub. No.: WO2019/010529
PCT Pub. Date: Jan. 17, 2019

(65) Prior Publication Data
US 2020/0290493 A1 Sep. 17, 2020

(30) Foreign Application Priority Data

Jul. 13, 2017 (AU) .................................. 2017902748
Jan. 2, 2018 (AU) .................................. 2018900007

(51) Int. Cl.
A47C 16/02 (2006.01)
B60N 3/06 (2006.01)
(52) U.S. Cl.
CPC ............ B60N 3/063 (2013.01); A47C 16/025 (2013.01)
(58) Field of Classification Search
CPC .. A47C 4/02; A47C 4/022; A47C 4/28; A47C 4/826; A47C 4/30; A47C 9/10;
(Continued)

(56) References Cited

U.S. PATENT DOCUMENTS 591,549 A * 10/1897 Behrens ................. A47C 4/286
248/155.5
1,169,454 A * 1/1916 Baxter .................... A47C 9/105
108/128

(Continued)

FOREIGN PATENT DOCUMENTS

JP 9-276079 A 10/1997 ............... A47C 6/02
WO WO 2015/176130 11/2015 ............... A47C 7/50

OTHER PUBLICATIONS

International Preliminary Report on Patentability issued in corresponding application, PCT/AU2018/050713, pp. 1-5 (dated May 13, 2019).

Primary Examiner — Kyle J. Walraed-Sullivan
(74) Attorney, Agent, or Firm — David G. Rosenbaum; Rosenbaum IP

(57) ABSTRACT

This invention relates in general to supports and in particular to collapsible portable travel supports for use in conjunction with a seat during travel. The support device has a main body of flexible material and a self-deploying support structure has a plurality of hollow sections having a slip joint connection and a chord secured to opposing ends of the structure and passing longitudinally through all sections. The self-deploying support structure is transformable between storage and deployed configurations where the slip joint connections of each section are mated to form a unitary structure. An attachment mechanism associated with the body attaches the body to the self-deploying support structure. The main body and self-deploying support structure are configured to form a self-supporting structure spaced apart from the seat in use and from a structure in front of the seat supporting the user.

20 Claims, 19 Drawing Sheets

(58) Field of Classification Search
CPC ....... A47C 9/105; A47C 16/02; A47C 16/025; B64D 11/0643; B60N 3/06; B60N 3/063
USPC .......................... 297/16.1, 16.2, 423.4, 423.1
See application file for complete search history.

(56) References Cited

U.S. PATENT DOCUMENTS

| | | | | |
|---|---|---|---|---|
| 2,375,819 | A * | 5/1945 | Reid | A47C 9/10 108/115 |
| 2,688,998 | A * | 9/1954 | Erickson | B61D 31/00 297/219.1 |
| 2,712,349 | A * | 7/1955 | Le Voir | A47C 5/06 297/440.11 |
| 3,061,374 | A * | 10/1962 | Grosfillex | A47C 5/06 297/440.11 |
| 3,122,397 | A * | 2/1964 | Arthurl | A47C 9/10 297/188.13 |
| 3,124,387 | A * | 3/1964 | Maclaren | A47C 4/286 297/16.2 |
| 3,695,702 | A * | 10/1972 | Ingellis | A47C 4/02 297/440.24 |
| 4,502,154 | A * | 3/1985 | Itoi | A41D 3/00 2/108 |
| 4,605,261 | A * | 8/1986 | Lee | A47C 4/286 297/16.1 |
| 4,673,211 | A * | 6/1987 | Hoffman | A45F 3/24 297/16.1 |
| 5,054,849 | A * | 10/1991 | Hoff | A47C 4/286 297/45 |
| 5,362,130 | A * | 11/1994 | Hoffman | A47C 1/146 297/16.2 |
| 5,408,710 | A * | 4/1995 | Garman | A47C 7/52 297/423.3 |
| 5,470,039 | A * | 11/1995 | Hilger | A47D 5/006 248/164 |
| 5,507,548 | A * | 4/1996 | Marhefka | A47C 4/283 297/45 |
| 5,556,167 | A * | 9/1996 | Siemion | B64D 11/0643 297/423.15 |
| 5,704,682 | A * | 1/1998 | Gorayeb | A47C 9/10 297/440.11 |
| 5,927,798 | A * | 7/1999 | Ahn | A45C 15/00 297/129 |
| 5,970,542 | A * | 10/1999 | Mays | A47G 9/066 2/69.5 |
| 6,375,258 | B1 * | 4/2002 | Fang | A47C 9/10 224/155 |
| 6,817,661 | B2 * | 11/2004 | Zheng | A47C 7/54 297/16.1 |
| 6,832,741 | B2 * | 12/2004 | Jarosz | B60N 3/063 244/122 R |
| 7,322,655 | B1 * | 1/2008 | Williams | A47C 7/52 297/423.15 |
| 7,338,131 | B2 * | 3/2008 | Forgatsch | B64D 11/0643 297/423.15 |
| 7,604,288 | B1 * | 10/2009 | Verhulst | A45F 4/02 297/129 |
| 8,894,139 | B1 * | 11/2014 | Coffey | A47C 4/286 297/45 |
| 10,010,179 | B1 * | 7/2018 | Stump | A47C 4/20 |
| 10,285,503 | B2 * | 5/2019 | Graybill | A47C 4/02 |
| 2003/0234561 | A1 * | 12/2003 | Zheng | A47C 5/10 297/45 |
| 2005/0082884 | A1 * | 4/2005 | Yao | A47C 4/24 297/16.1 |
| 2006/0061146 | A1 * | 3/2006 | Grace | A47C 4/38 297/16.2 |
| 2006/0071511 | A1 * | 4/2006 | Tseng | A47C 4/28 297/16.1 |
| 2006/0071512 | A1 * | 4/2006 | Saakyan | A47C 9/105 297/16.1 |
| 2007/0228780 | A1 * | 10/2007 | Grace | A47C 9/10 297/45 |
| 2007/0257540 | A1 * | 11/2007 | Park | A47C 4/286 297/451.2 |
| 2008/0012399 | A1 * | 1/2008 | Lin | A47C 4/283 297/188.08 |
| 2009/0230736 | A1 * | 9/2009 | Homans | A47C 7/008 297/16.2 |
| 2011/0025104 | A1 * | 2/2011 | Fusao | A47C 4/02 297/55 |
| 2011/0089725 | A1 * | 4/2011 | Shantha | B60N 3/06 297/180.1 |
| 2012/0104805 | A1 * | 5/2012 | Lah | A47C 4/286 297/16.1 |
| 2013/0313865 | A1 * | 11/2013 | Homans | A47C 4/30 297/16.1 |
| 2015/0048657 | A1 * | 2/2015 | Sabina | A47C 7/66 297/16.2 |
| 2015/0091335 | A1 * | 4/2015 | Lee | A47C 3/18 297/16.1 |
| 2015/0189994 | A1 * | 7/2015 | Lee | A47C 4/02 297/16.1 |
| 2015/0351548 | A1 * | 12/2015 | Schiraga | A47C 4/286 297/452.1 |
| 2015/0374131 | A1 * | 12/2015 | Kim | A47C 9/10 297/16.1 |
| 2016/0022042 | A1 * | 1/2016 | Homans | A47C 4/03 297/16.1 |
| 2016/0113402 | A1 * | 4/2016 | Lee | A47C 4/42 297/16.2 |
| 2016/0113403 | A1 * | 4/2016 | Lee | A47C 4/42 297/16.2 |
| 2016/0280103 | A1 * | 9/2016 | Cayzer | B60N 2/995 |
| 2017/0027327 | A1 * | 2/2017 | Homans | A47C 4/32 |
| 2017/0181548 | A1 * | 6/2017 | Yoo | A47C 4/44 |
| 2017/0311723 | A1 * | 11/2017 | Lenhart | A47C 4/28 |
| 2018/0027970 | A1 * | 2/2018 | Frankel | A47C 4/48 |
| 2018/0035806 | A1 * | 2/2018 | Yang | A47C 4/28 |
| 2018/0070728 | A1 * | 3/2018 | Humphreys | A47C 3/027 |
| 2018/0249837 | A1 * | 9/2018 | Cohen | A47C 4/38 |
| 2018/0303240 | A1 * | 10/2018 | Kim | A47C 4/34 |
| 2018/0325277 | A1 * | 11/2018 | Perera | A47C 16/02 |
| 2019/0029430 | A1 * | 1/2019 | Yang | A47C 4/44 |
| 2019/0038030 | A1 * | 2/2019 | Tseng | A47C 4/283 |
| 2019/0045931 | A1 * | 2/2019 | Frankel | A47C 4/286 |
| 2019/0104850 | A1 * | 4/2019 | Frankel | A47C 4/286 |
| 2019/0290007 | A1 * | 9/2019 | Chen | A47C 4/02 |

\* cited by examiner

COLLAPSIBLE TRAVEL SUPPORT DEVICE

CROSS-REFERENCE TO RELATED APPLICATIONS

The present application claims priority from and is a National Phase of PCT Application No. PCT/AU2018/050713, filed Jul. 11, 2018, which claims priority to Australian Patent Application No. AU 2018900007, filed Jan. 2, 2018, and Australian Patent Application No. AU 2017902748 filed Jul. 13, 2017, herein incorporated by reference in their entireties.

FIELD OF THE INVENTION

This invention relates in general to supports and in particular to portable travel supports for use in conjunction with a seat during travel. The present invention has been found to be particularly but not exclusively useful as a collapsible footrest for supporting a user's legs and feet in confined spaces such as between rows of seats on airplanes, trains and the like.

BACKGROUND OF THE INVENTION

It should be noted that reference to the prior art herein is not to be taken as an acknowledgement that such prior art constitutes common general knowledge in the art.

Travelling has become a very common part of life, whether it is for work, visiting friends or family or for a vacation. People often travel for long periods during which time they are seated in a chair and are generally sedentary. In particular, travelling in airplanes requires a passenger to be seated in a cramped position for many hours. Travelling in trains, buses and the like can also see a passenger seated for long periods of time in awkward and uncomfortable positions. Many people cope with this discomfort by elevating their feet; usually this is accomplished with a provided foot rest built into the seat or the seat in front, or with a makeshift footrest such as piece of luggage placed on the floor.

One of the problems associated with sitting for long periods is that the person can become very uncomfortable and can lead to tired and aching muscles, swollen legs, cramps, deep vein thrombosis (DVT) and even the life threatening condition of pulmonary emboli. Furthermore, it can be difficult to sleep in an upright seated position and travelers can often become sleep deprived. All of these factors make travelling for long periods uncomfortable. Also passengers often require significant recovery time which is detrimental to work commitments or enjoyment of vacation time.

Several devices have been developed in order to make travelling more comfortable and/or to help prevent DVTs. Some such devices include padded or inflatable neck supports, which facilitate sleeping in a chair, and back supports that prevent an aching back. These neck and back supports are useful to provide an alternative position however for many people they do not provide enough comfort to significantly ameliorate the effects mentioned above. Some passenger chairs in airplanes, trains and buses have the ability to recline partially and/or have an extendible foot rest built into the chair. More commonly, a passenger chair can have a fold down foot rest at the back such that the person sitting in the chair behind can rest their feet on the foot rest.

It is desirable to be able to raise one's feet and legs to reduce fatigue and pain, to increase blood flow in the venous system and therefore to help prevent DVTs. It is also advantageous to be able to sleep comfortably on your side with legs supported. However, these foot rests only raise the legs by a small distance and for many people do not provide the support required for comfort, improved blood flow or sleeping.

Conventional footrests tend to be bulky, and are not easily portable. Moreover, because these footrests typically rest on the surface below the user, it is difficult to adjust the height of these footrests to account for users with different leg lengths. The way in which these devices are utilised in or on passenger seating is also proving to be problematic. For example, some airlines now require that any footrest or support used in flight must not be attached to either the seat on which the passenger is seated and/or not be attached or supported on the seat in front of the seated passenger. This creates a number of issues for the passenger who wishes to support their feet or legs at a raised height.

Other devices often used to prevent DVTs include pressure stockings or socks which apply pressure to the ankles and calves to discourage pooling of blood in the veins of the legs. Inflatable leg compression devices have also been used to apply pressure to the legs to prevent pooling of blood in the legs. These compression devices can be uncomfortable and can be cumbersome or inconvenient if a passenger needs to get up and move around.

Clearly it would be advantageous if a collapsible travel support device could be devised that helped to at least ameliorate some of the shortcomings described above. In particular, it would be beneficial to provide a collapsible footrest for supporting a user's legs and feet in confined spaces such as between rows of seats on airplanes, trains and the like or at least provide the public with a useful choice.

SUMMARY OF THE INVENTION

The present invention has been developed to provide a collapsible travel support device for supporting a user's feet or legs in confined spaces such as between rows of seats on airplanes, trains and the like. The present invention provides a self-supporting device which is releasably attached to or supported from the seat in use and is positioned or spaced from the seat or support in front.

In accordance with a first aspect, the present invention provides a collapsible seating support device for use in conjunction with a seat to support a user during a sitting position in situ, the support device comprising: a main body of flexible material having a front section with a central body portion and a pair of lateral wings extending from either side of the central body portion, the main body is capable of being manipulated to alter a three dimensional form of the body to form a recess for a user to rest their foot and/or leg therein; a self-deploying support structure having a pair of end sections and a base section, each section comprising shaft having a hollow core and a first and second connector ends, the connector ends forming a slip joint connection between adjacent sections, and a cord secured to opposing end sections of the structure and passing longitudinally through all of the sections, and wherein the self-deploying support structure is transformable between a storage configuration where each of the sections is uncoupled and secured in a compact bundle, and a deployed configuration where the slip joint connections of each section are mated to form a unitary structure; an attachment mechanism associated with each lateral wing of the body for attaching each respective wing to the self-deploying support structure, each attachment mechanism comprises a pocket being secured at its outer margins to each lateral wing and a second cavity for receiving a padding means therein, the pocket having an opening with a resilient edge portion for access therein; a coupling device comprising a shaft having a hollow core and a first end spaced apart from a second end, the first end detachably connecting to the first connector end of each end segment of the self-deploying support structure, a body engaging member received within the second end and adapted to abut the padding means within the pocket of the attachment means on each wing, and a collar spaced apart from the first and second ends of the shaft, the collar being releasably retained by the resilient edge portion of the pocket of each wing of the main body; and wherein the main body and the self-deploying support structure are configured to form a self-supporting structure spaced apart from the seat in use and from a structure in front of the seat supporting the user.

Preferably, the main body may further comprise a tail section extending longitudinally from one end of the central body portion.

Preferably, the tail section may be configured to couple the main body to the seat via the user sitting on the tail section on the seat. Alternatively, the tail section may be configured to be contained in and along the one end of the central body portion in use.

Preferably, each lateral wing may comprise a pair of peripheral outer edges extending from the central body portion. The outer edges may be formed approximately orthogonal to one another.

Preferably, each pocket may have a side secured along a portion of the length of the outer edges thereof of each lateral wing, and a further side having the opening for access into the pocket.

Preferably, the further side may be partly secured to each lateral wing.

Preferably, the opening in the further side of the pocket may be sized to allow the insertion of the coupling device and the resilient edge portion is adapted to releasably retain the coupling device therein. The first cavity may have a non-slip surface adapted to frictionally engage at least one surface of an end of the coupling device.

Preferably, the padding means may further minimise an impact of the coupling device against the structure in front of the seat supporting the user. The padding means may be an open or closed cell foam material.

Alternatively, each attachment mechanism may comprise at least one first attachment member associated with the wing and configured to couple at least one second attachment member on the wing to form a connection, wherein the connection is configured for securely coupling the wing to the coupling device in situ. Preferably, each attachment mechanism may comprise two first attachment members associated with the wing and adapted to couple two second attachment members on the wing to form two connections, wherein the connections are adapted to securely couple the wing to the coupling device in situ.

Preferably, the second attachment members may be oriented at an angle relative to one another. One of the two second attachment members may be positioned along one of the outer edges of the wing and the other second attachment member is positioned along the other outer edge of the wing. Preferably, the first and second attachment members may be joined by a connecting member which when the first and second attachment members are coupled the connecting member forms a cavity along the outer edge of the wing, the cavity being adapted to receive an end of the coupling device. The cavity may have a non-slip surface adapted to frictionally engage the end of the coupling device.

Alternatively, the cavity may have a fastener means adapted to engage a complementary fastener located on at least one surface of the end of the coupling device. The fastener means and complementary fastener may be a hook and loop fastener system.

Preferably, the cord may be secured in each first connector end of each end section by a retainer device, the retainer device is adapted to be partially contained within the first connector end of each end section. The unitary structure formed by the deployed configuration of the self-deploying support structure may be a U-shaped structure with the pair of end sections forming a pair of longitudinally extending legs extending from the base section.

Preferably, the base may further comprise an outer surface adapted to be in frictional engagement with a surface upon which the base of the self-deploying support structure is placed in use to enable the base to be retained upon that surface. The outer surface may have a surface treatment which improves the frictional engagement of the base section with the surface upon which the base of the self-deploying support structure is placed in use. The surface treatment may be a foam sleeve extending longitudinally and around the base section.

Preferably, the base may further comprise a first base section and a second base section, each base section comprising a shaft having a hollow core and first and second connector ends, the connector ends forming a slip joint connection between adjacent sections.

Preferably, in use the collapsible seating support device may be formed by coupling the first connector end of each end section of the self-deploying support structure to the first end of the coupling device located externally of the pocket on each wing, wherein the coupling device is releasably retained by the resilient edge portion of the pocket on each wing of the main body.

Preferably, the body engaging member may have a shaped end which abuts against the padding means within the pocket. The body engaging member may have a spherical shaped end.

Preferably, the first end and the shaft of the coupling device, the first and second connector ends and the shafts of each section, the first and second connector ends of the base sections may be all shaped so as to form a slip joint connection for each section when in the deployed configuration. Preferably, the first end and the shaft of the coupling device, the first and second connector ends of each section, the first and second connector ends of the base sections and the respective shafts of each section may have a circular cross-sectional shape. Alternatively, the first end and the shaft of the coupling device, the first and second connector ends of each section, the first and second connector ends of the base sections and the shafts of each section may be all shaped so as to securely retain and provide an anti-rotation mechanism for each section when in the deployed configuration. The first end and the shaft of the coupling device, the first and second connector ends of each section, the first and second connector ends of the base sections and the shafts of each section may have a cross-sectional shape in the form of any one of elliptical, square, hexagonal or triangular shape to secure each section when in the deployed configuration.

Preferably, the cord may be a dynamic rope, the dynamic rope is adapted to exert tension on the deployed unitary structure to retain each section in a connected configuration during use. The dynamic rope may be a kernmantle rope such as a nylon kernmantle rope. Alternatively, the cord may be an elastic cord, the elastic cord is adapted to exert tension on the deployed unitary structure to retain each section in a connected configuration during use. The elastic cord may be any one of a double-elastic nylon cord or double elastic tension cord, a shock cord, or a braided cord of cotton, nylon, polyester or polypropylene.

Preferably, an anterior part adjacent the front section of the recess may be substantially open to allow the user to extend their foot and/or leg beyond the recess.

Preferably, the main body and the attachment mechanism may be formed from a flexible and durable material. The main body may be foldable, rollable or otherwise compactable and the device further comprises a bag for retaining and transporting the compacted body and the self-deploying support structure therein.

Preferably, the device may further comprise one or more pillows configured to be supported within the recess. The one or more pillows when placed within the recess of the main body may be designed to provide the three dimensional form of the recess for a user to rest their foot and/or leg therein. The one or more pillows may be removable from the recess. The one or more pillows may be inflatable pillows.

Preferably, the sections of the self-deploying support structure and the shaft of the coupling device may be manufactured from any one of aluminium, graphite-reinforced plastic or other fibre-reinforced plastic.

Preferably, the body engaging member and the collar of the coupling device may be moulded plastic members formed on or placed within the shaft of the coupling device.

In accordance with a further aspect, the present invention provides a collapsible seating support device for use in conjunction with a seat to support a user during a sitting position in situ, the support comprising: a main body of flexible material that is capable of being manipulated to alter a three dimensional form of the body to form a recess for a user to rest their leg and/or foot therein; the main body comprising: a front section having a central body portion; a pair of lateral wings extending from either side of the central body portion, each lateral wing having a pair of peripheral outer edges extending from the central body portion; and a tail section extending longitudinally from one end of the central body portion; an attachment mechanism associated with each lateral wing for coupling the respective wing to a self-deploying support structure, the self-deploying support structure comprising: a pair of end sections and a base section, each section having a shaft having a hollow core and a first and a second connector ends; a cord anchored at said first connector ends of each end section and threaded through the hollow core of each section; and wherein the self-deploying support structure is transformable between a storage configuration where each of said sections is uncoupled and secured in a compact bundle, and a deployed configuration where said first and second connector ends of each section are mated to form a unitary structure; a coupling device secured within the attachment mechanism of each lateral wing and having an end extending from the attachment mechanism to allow the end to be attachable to the first connector end of the end sections of the self-deploying support structure; and wherein the main body and the self-deploying support structure are configured to form a self-supporting structure spaced apart from the seat in use and from a structure in front of the seat supporting the user.

Preferably, the collapsible seating support device may comprise any one of the features of the first aspect.

Preferably the device may be configured for use with a seat of a vehicle, such as a car, bus, train, airplane or the like.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

DETAILED DESCRIPTION OF THE INVENTION

Figure 1:
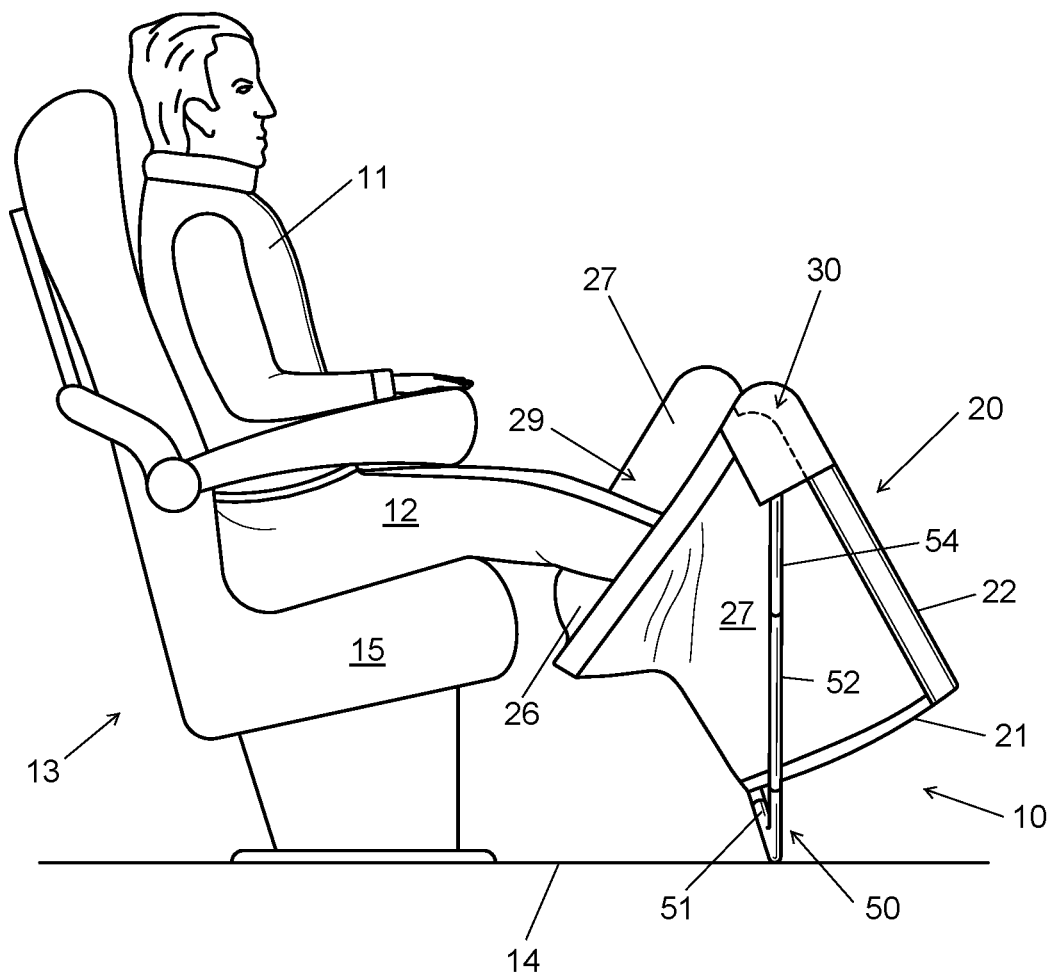
FIG. 1 shows a side view of a collapsible support device in use in accordance with an embodiment of the present invention.

Travelling has become a very common part of life with people travelling for long periods during which time they are seated in a chair and are generally sedentary. By way of example only and by no way limiting, the present invention will largely be described in relation to travelling in airplanes which requires a passenger to be seated in a cramped position for many hours. Some people experience feet and leg swelling when they fly long distances. When sitting upright and inactive for long periods, gravity and inertia make it much harder for blood to get back to your heart and therefore leaving people with uncomfortable swollen legs, feet and ankles.

Elevating your feet during flights can help by increasing venous return to the heart which helps to keep swelling to a minimum. The present invention is a collapsible travel support device 10 which consists of a lightweight material hammock 20 that connects to a self-deploying support structure 50 by pockets 30 on the main body or hammock 20. The collapsible travel support device 10 including the hammock 20 and the self-deploying support structure 50 are supported upon a surface 14 in the proximity of the user 11 seated upon a seat 13 and spaced apart from a structure such as another seat 13 in front of the seated user 11. The main body or hammock 20 hangs down to create a hanging space or recess 29 to put your legs 12 up on or through all while keeping them elevated. The collapsible travel support device 10 is suitable for use by both adults and children of all ages, in the preferred embodiments is particularly suited for use with vehicle seats 13, such as cars, buses, coaches, vessels or aircrafts to provide support to a user during short and long travel journeys. The device 10 is preferably portable, easily assembled and compactable as will be described making it particularly well suited for travel applications. The preferred embodiments of the collapsible travel support device 10 of the invention will be described with reference to the drawings.

Referring to FIGS. 1 to 16, a first preferred embodiment of a collapsible travel support device 10 for use in conjunction with a seat 13 (in particular a seat of a travel vehicle) and a support structure 50 is shown.

FIG. 1 illustrates the device 10 in use in which a user 11 has his legs 12 placed within the recess 29 of the flexible main body 20 while being seated upon the seat cushion 15 of a seat 13. In this position the legs 12 of the user 11 are raised above the floor 14 by their placement within the recess 29 of the support device 10. Within the recess 29 one or more pillows 110 can be placed which provides both comfort for the user 11 and a method of varying the height to which the legs 12 can be raised. For example, more than one pillow 110 can be placed in the recess 29 which effectively varies the height to which the legs 12 can be raised above the floor 14. The placement of the pillow 110 also aids in keeping the recess 29 open. Due to the flexible nature of the main body 20 by inserting the pillow 110 into the recess 29 aids in opening up and keeping open the recess 29, this allows the user 11 to easily place their legs 12 within the main body 20. In essence the pillows 110 aid in forming the three dimensional shape of the main body 20.

The collapsible travel support device 10 has a self-deploying support structure 50 having a base 51 and a number of hollow sections 52 with connectors located at either end of each section 52. Attached to each end section 52 of the unitary U-shaped support structure 50 are coupling elements 54 for coupling the self-deploying support structure 50 to the attachment mechanism 30 on each wing 27 of the main body 20. An end of the coupling element 54 extends externally of each attachment mechanism 30 on the wing 27 of the main body 20, the end attaches to the first connector at the end of the section 52 of the self-deploying support structure 50 to form the collapsible travel support 10. The U-shaped support structure 50 is transformable between a storage configuration where each section 52 and the base 51 is uncoupled and secured in a compact bundle and a deployed configuration where the connector ends of each section 52 are mated with the base 51 to form the unitary structure.

Figure 2:
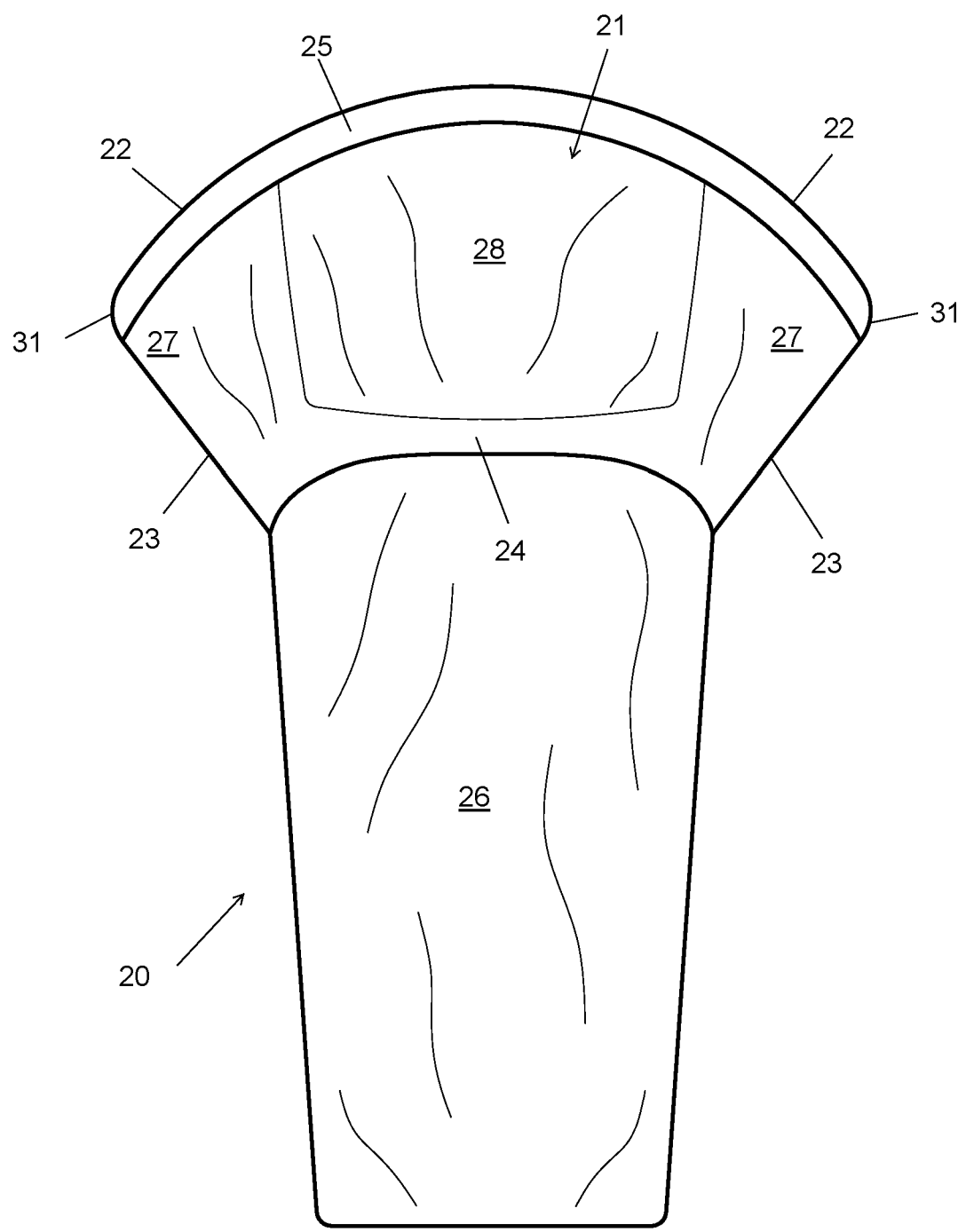
FIGS. 2 and 3 show front and rear plan views of a first embodiment of the main body of the collapsible support device of FIG. 1.
Figure 3:
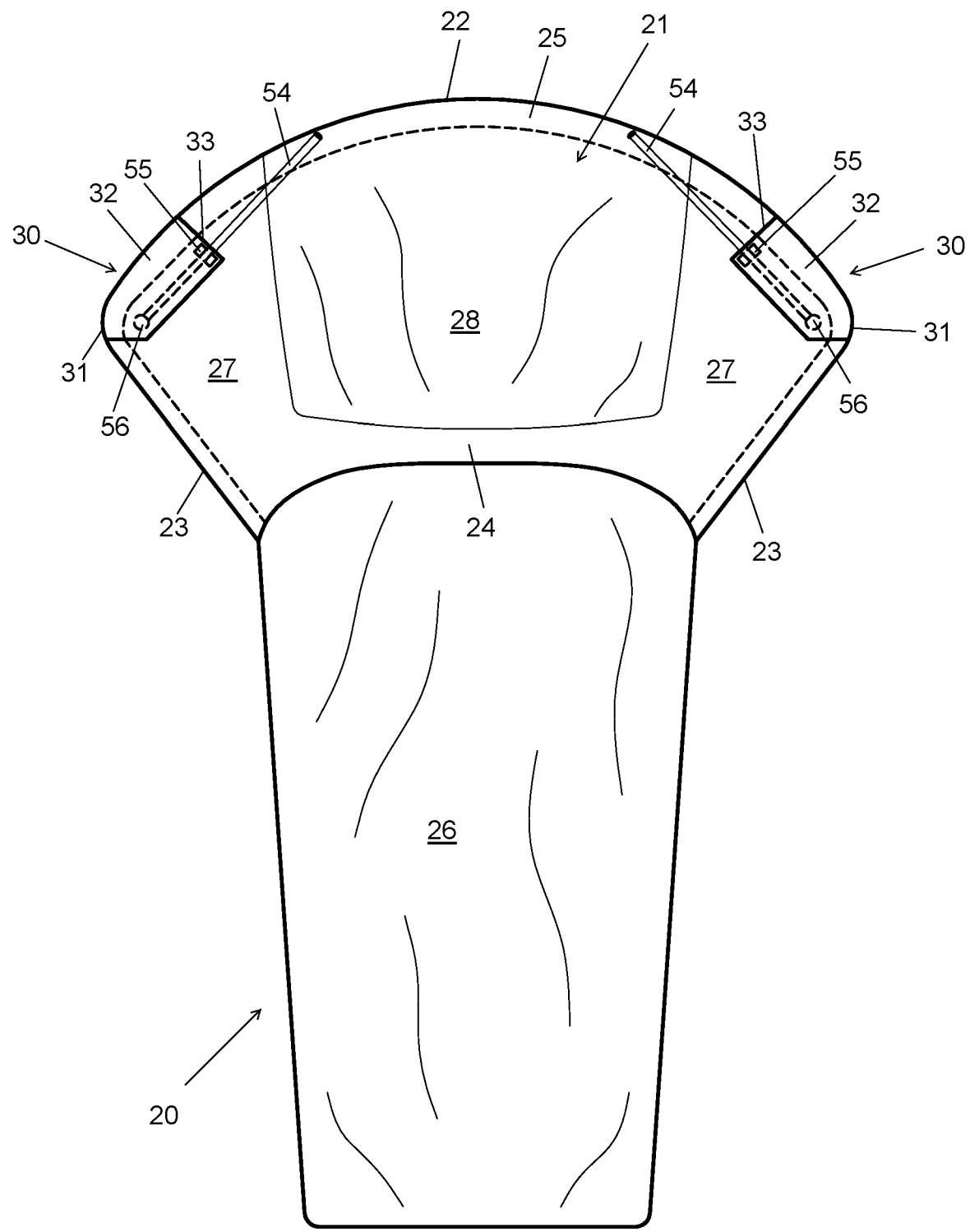

The support device 10 has two main components, a flexible main body 20 which is supported upon a collapsible support structure 50. FIGS. 2 and 3 show front and rear views of a first embodiment of the flexible main body 20 of the collapsible travel support device 10 in an unassembled or spread out state to illustrate the components of the main body 20. The main body 20 is capable of being manipulated to alter a three dimensional form of the body 20 to form the recess 29 for a user 11 to rest their leg 12 and/or foot therein. Relative positions of various parts, portions and sections of this main body 20 will now be described with reference to the substantially spread out state.

The main body 20 is formed from one or more sheets of durable material to provide a body structure that can be manipulated to adjust a three dimensional form of the body for achieving a support structure in the assembled state (see FIG. 1 for example). The main body 20 of the device 10 has a front section having a central body portion 21 and a pair of lateral wing portions 27 extending from either side of the central body portion or front portion 21, and a tail section 26 comprising a length of material extending longitudinally from a rear part 24 of the central body portion or front portion 21. The central body portion or front portion 21 comprises a front part 28 and the rear part 24. The tail section 26 extends from adjacent the rear part 24 of the central body portion 21. Any one or more of the portions, parts or sections described thus far may be integrally formed, or separately formed or cut and fixedly coupled to one another via sewing/stitching, adhesive or any other suitable coupling means.

The front section 21 is preferably of a greater width (at its widest region) than the tail section 26. The tail section 26 is preferably of a uniform width along its length and of a sufficient length to extend at least along a substantial portion of the sitting surface 15 of the users seat 13. It will be appreciated that in alternative embodiments the tail section 26 may be non-uniform in width along its length. In an assembled configuration as illustrated in FIG. 1 the main body 20 is approximately the width of the usable area of the vehicle seat, or approximately the width of the user's body.

Each wing portion 27 comprises a pair of outer edges 22 and 23 joined at the end 31 on each wing 27. The first outer edge 22 extends obtusely from an outer leading edge of the front part 21 and the second outer edge 23 extends from a terminal end 31 of the first edge 22 towards the tail section 26. Extending the length of the outer edge 22 and across the front section 21 is a reinforced section 25 which provides further strength across the open front of the main body 20 when in use.

Figure 5:
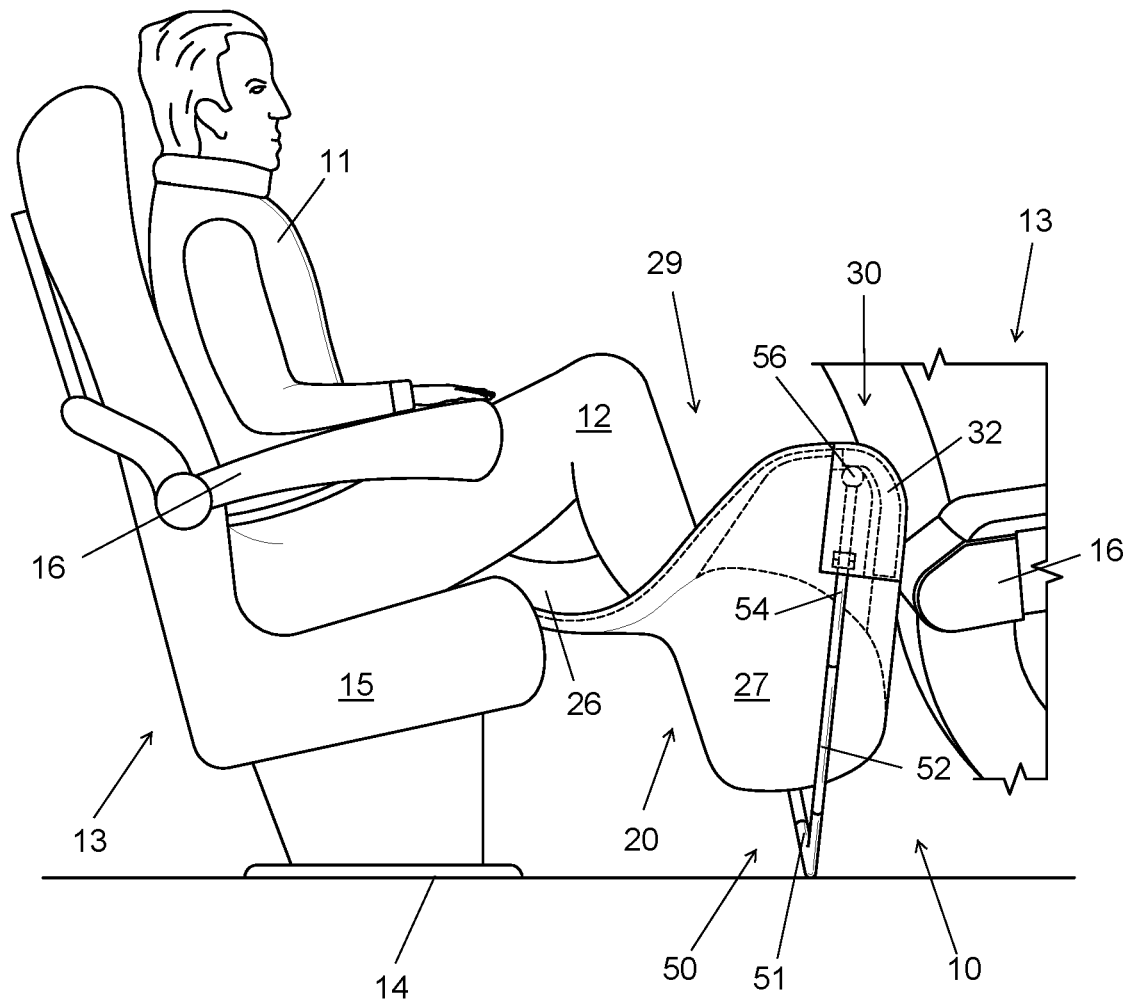
FIG. 5 shows a side view of a collapsible support device in use with the user seated upon the tail section of the main body and the feet and/or legs supported upon a pillow(s) within the recess in accordance with an embodiment of the present invention.
Figure 16:
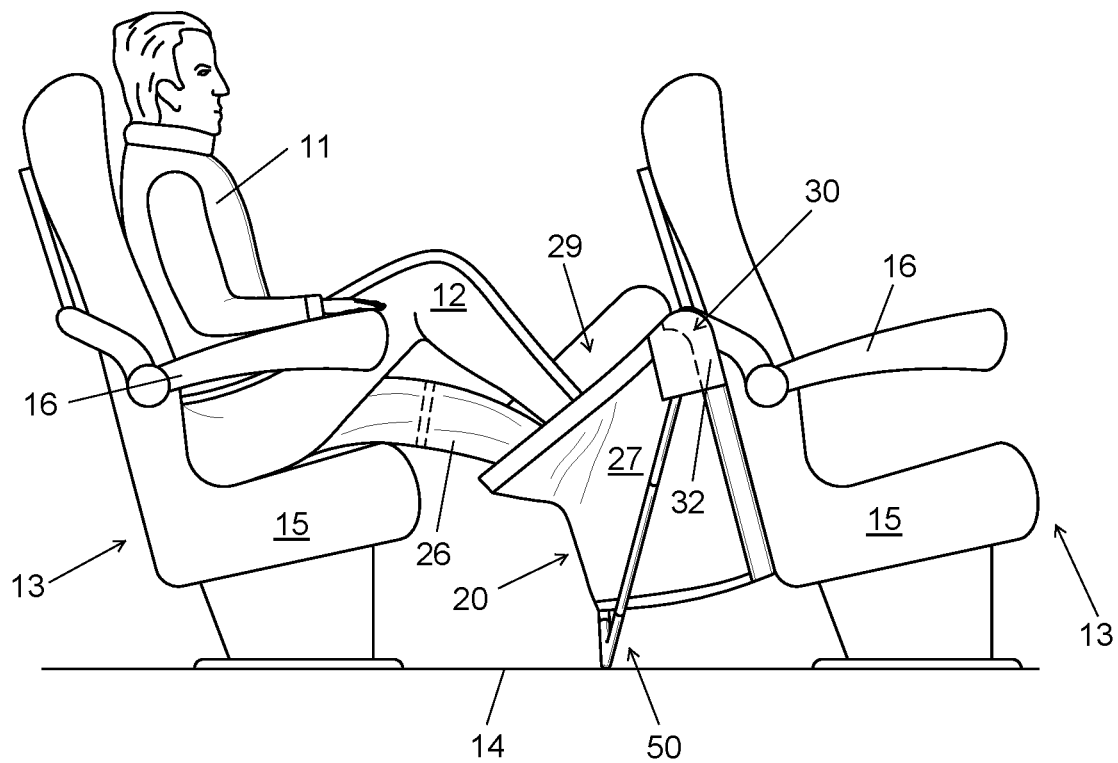
FIG. 16 shows a side view of a collapsible support device in use with the user seated upon the tail section of the main body and the feet and/or legs supported upon a pillow(s) within the recess and showing the self-deploying support structure at an inclined angle in accordance with an embodiment of the present invention.

As shown in FIG. 3 (the external side of the main body 20), this side of the main body 20 has the attachment mechanism 30 positioned on each lateral wing 27. The attachment mechanism 30 is formed as a pocket 30 which extends a distance from each terminal end 31 of the wing 27 and along the pair of outer edges 22, 23. The pockets 30 form a cavity in each wing 27 for receiving the coupling elements 54 of the self-deploying support 50. The pockets 30 are sewn or otherwise fixed onto each wing 27 of the main body 20. On the inside and adjacent the terminal end 31 of each pocket 30 and extending parallel with the outer edge 22, a foam element 32 is sewn into the pocket 30 to assist in retaining an end 56 of the coupling element 54 in place within the cavity of the pocket 30 when in use. The foam element 32 also provides a cushioning or padding element between the coupling device 54 and the structure or seat 13 in front of the seated user 11. The padding element 32 also reduces any associated noise which may occur due to the knocking or rattling between the associated surfaces and components when in use. On the internal side of the pocket 30 away from terminal end 31, a side 33 of the pocket 30 has an opening for allowing the coupling element 54 to be inserted into the pocket 30. A section of the shaft of the coupling device 54 extends externally of the side 33 of the pocket 30. The end forms a slip joint connection with the first connector 62 located at the end of section 52 of the self-deploying support structure 50. The opening in the side 33 of the pocket 30 has a resilient edge portion which is used to secure the collar 55 of the coupling element 54 within the pocket 30. The resilient edge portion is an elasticized edge which once the coupling element 54 is inserted inside the pocket 30 the edge portion contracts around the collar 55 to retain the coupling element 54 in place. The pocket 30 forms a recess for receiving the coupling member 54. The opening in the side 33 of the pocket 30 and the resilient edge portion allow the user 11 to change the angular positions of both the main body 20 and the collapsible support member 50 with respect to each other. The user 11 is able to swing the main body 20 through an arc around the substantially vertical arms of the U-shaped collapsible support member 50. Likewise the user 11 can also vary the angle of the vertical arms of the U-shaped collapsible support member 50 with respect to the floor 14. This effectively allows the user 11 to achieve many varied positions that provide most comfort for the user 11. Some examples of the variations are illustrated in FIGS. 1, 5 and 16.

The main body 20 of the device 10 is foldable along at least the following regions: at the junction between the tail section 26 and front section 21, at the junctions between each wing portion 27 and the front part 28 of central body portion 21, and at the junction between the front part 28 and rear part 24 of the central body portion 21. The main body 20 of the device 10 is at least inwardly foldable at these regions but preferably foldable in either direction. The remaining regions of the main body 20 may be substantially rigid and/or less flexible but in the preferred embodiment the entire main body 20 is formed from one or more sheets of durable, high tensile and sheer-strength material that is/are substantially flexible and foldable in various directions and angles. In the preferred embodiment, the main body 20 comprises one or more sheets formed from a plastics material. The main body 20 may comprise one or more sheets formed from a textile fabric in alternative embodiments. The main body 20 is foldable into a three dimensional form or structure to form a recess 29 suitable for supporting the feet or at least a lower body portion or legs 12 of the user 11.

Figure 4:
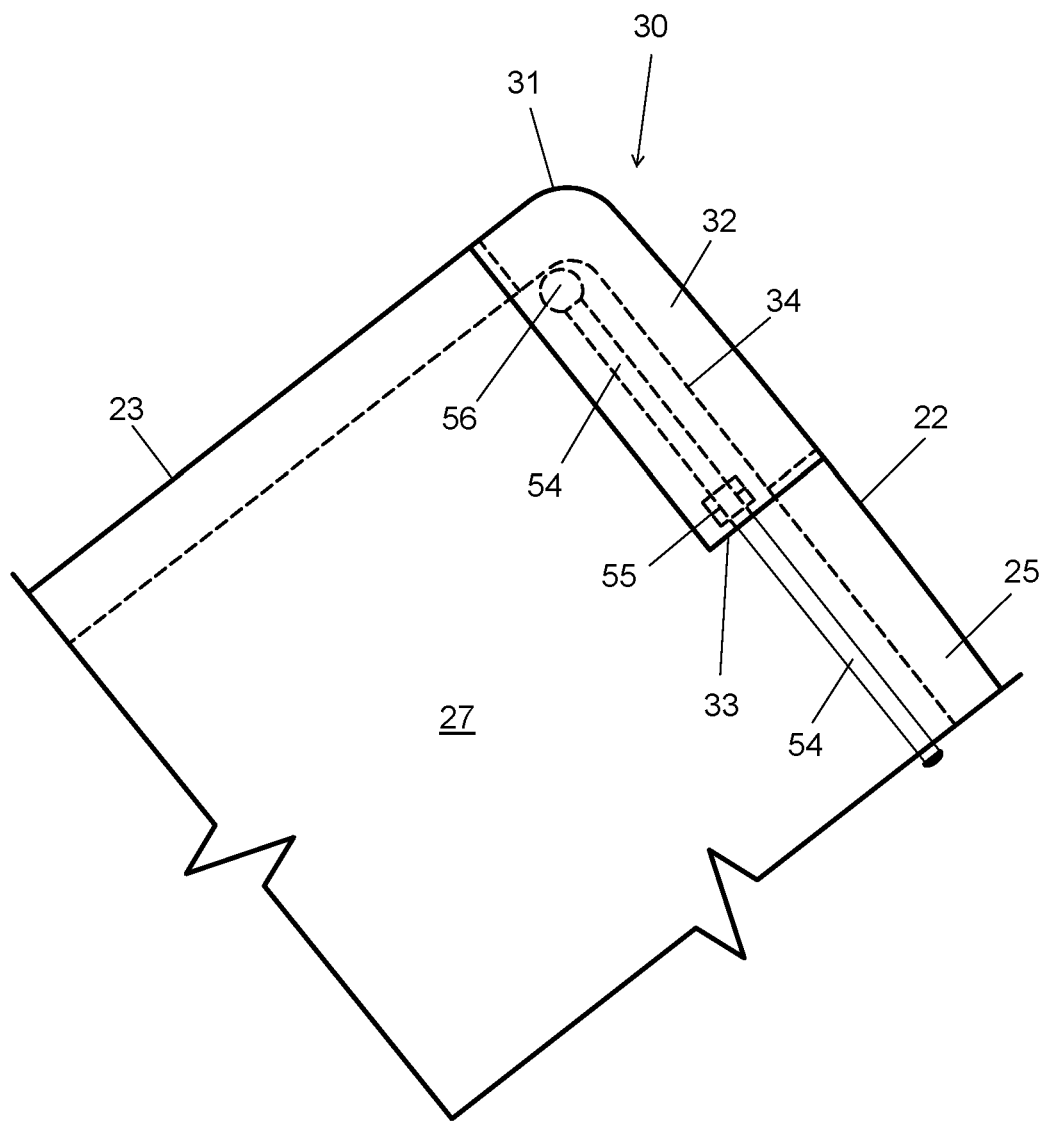
FIG. 4 shows a partial perspective view of a wing of the main body with a coupling device located within an attaching mechanism with the hidden detail of the coupling device shown.

In a preferred embodiment as illustrated in FIGS. 1, 3 and 4, the coupling element 54 is fixed within the pocket 30 of each wing 27. As illustrated the coupling element 54 is sewn or otherwise fixed within the pocket 30 such that the coupling element 54 is retained within the attachment mechanism or pocket 30 of each wing 27 and folded as described above. Only one of the wings 27 is shown in FIG. 4 as the opposite wing is formed in an identical fashion.

Each pocket 30 extends a distance from each terminal end 31 of the wing 27 and along the pair of outer edges 22, 23. The pocket 30 extends further along the outer edge 22 than it does along the outer edge 23. The foam element 32 extends substantially the same distance along the outer edges 22, 23 as the pocket 30 which contains the foam element 32, that is the foam element 32 follows the pocket 30 around the outer edges 22, 23. One side 33 of the pocket 30 has an opening with the resilient edge portion for receiving the coupling element 54 therein. The pockets 30 are sewn or otherwise fixed onto each wing 27 of the main body 20. A compartment 34 is sewn into each pocket 30 for containing the foam element 32. The coupling element 54 has a body engaging end element 56 which has a surface which abuts against the foam element 32 and at approximately the terminal end 31 of the wing 27 within the pocket 30. A collar 55 is positioned along the coupling element 54 and spaced apart from each end of the coupling element 54 such that when it is positioned within the pocket 30 the collar 55 is positioned adjacent or near the side 33 of the pocket 30. Both the body engaging element 56 and the collar 55 are molded or fixed to a hollow shaft of the coupling element 54. The hollow shaft which extends externally of the pocket 30 has an opening which is inserted or placed over the end section 52 of the self-deploying support structure 50.

FIG. 3 shows the preferred embodiment of the external side of the main body 20 with both coupling elements 54 installed within each pocket 30 on each wing 27. As shown in FIG. 1 when the main body 20 is folded to form a three dimensional shape with the recess 29 for receiving the legs or feet of a user 11, the coupling elements 54 are located on the outer sides of each wing 27. This allows the end section 52 of the self-deploying support structure 50 to be received within the opening of the coupling element 54 to form the support structure 50 for the main body 20 of the collapsible travel support device 10.

FIG. 5 illustrates one use of the collapsible travel support device 10 in which the user 11 is sitting upon the tail section 26 on the seat 13 and the legs 12 of the user 11 are in a raised position. In this embodiment the backside and/or tops of the legs of the user 11 are supported on a seating surface 15 with the tail section 26 of the main body 20 placed between the seating surface 15 and the backside of the user 11. The weight of the user 11 in the seated position is utilised to support one end of the collapsible travel support device 10. The travel support device 10 is supported on the floor 14 by the base 51 of the collapsible support 50 and the user's feet and/or legs 12 are positioned within the recess 29. In this embodiment the legs 12 are in a substantially raised position due to the placement of pillows 110 within the recess 29. To easily modify the height or position of the legs 12 more or less pillows 110 can be positioned within the recess 29. Likewise, the position of the collapsible support device 10 on the floor 14 can be varied by the amount of tail section 26 which is restrained beneath the user 11. For example, if the user 11 would prefer the support device 10 to be positioned closer to the seat 13 upon which they are seated then more of the tail section 26 is supported under the user 11 on the seating surface 15 and vice versa if the user 11 would prefer the support device 10 was positioned further away from the seat 13 upon which they are seated.

The coupling device 54 is secured within the attachment mechanism or pocket 30 on each wing 27 of the main body 20. The body engaging end 56 abuts against the foam element 32 by the user 11 applying a vertical force or weight of the feet and/or legs 12 within the recess 29. As shown the bottom of the coupling device 54 protrudes from the opening within one side 33 of the pocket 30. The bottom end of the shaft of the coupling device 54 is attached to the end section 52 of the support structure 50 to support the main body 20 on the support structure 50. This effectively forces the end 31 and the foam element 32 of the body 20 against the body engaging end 56 of the support structure 50 and anchors the front end of the collapsible support device 10 in the position illustrated in FIG. 5.

A non-slip coating or surface finish 58 is applied to the base 51 of the collapsible support 50 to provide frictional engagement with the floor 14 to prevent or at least reduce the forward movement of the collapsible support 50 in use. A further support structure or seat 13 located forward of the seated user 11 has an arm 16 with a rear support mounted to either side of the seat 13. As shown the foam element 32 abuts against or is supported against the rear support arm of the arm 16. The clearance imparted to the main body 20 by the positioning of the foam element 32 provides an amount of clearance for the arm of the user 11 when rested upon the arm 16. This ensures the user 11 seated in front seat 13 in which the travel support device 10 is being used is in no way hampered and has ample arm movement available without restriction. The addition of the foam element 32 in the pocket 30 ensures that the coupling device 54 makes little or no noise if it hits against the rear end of the arm 16. This is particularly important on aircraft were there is a significant amount of vibration. As above it also provides a soft surface if contacted by the arm of the user seated in the seat 13 in front of the user 11 which is using the travel support device 10.

Figure 6:
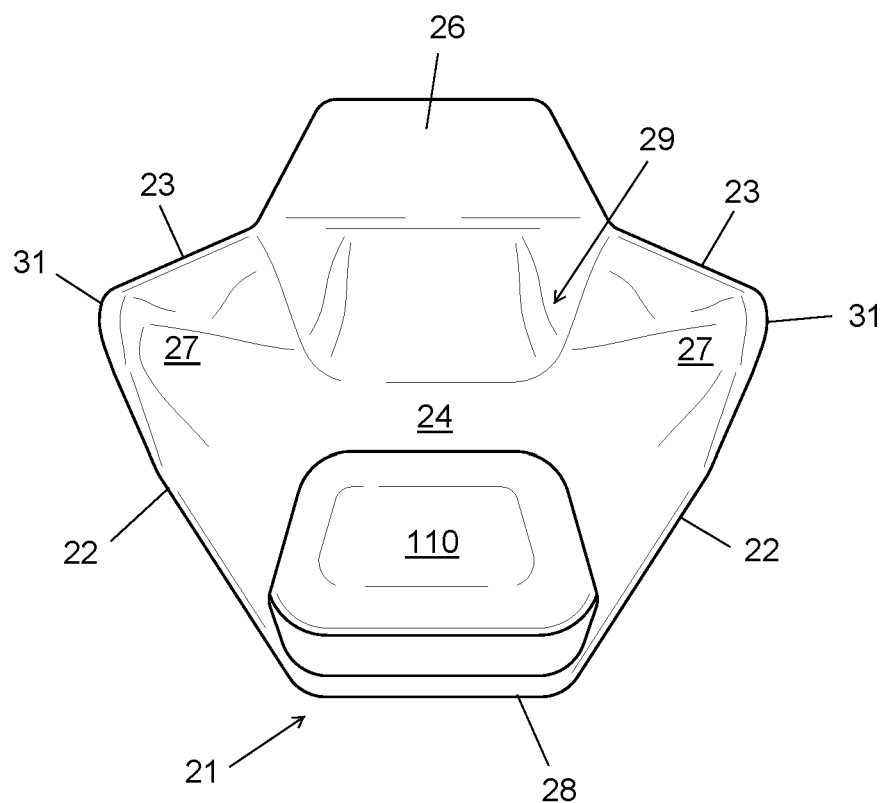
FIGS. 6 and 7 show a view from the front and above of the collapsible support device of FIG. 1 with a pillow within the recess and the tail extended in FIG. 6 and rolled up in FIG. 7.
Figure 7:
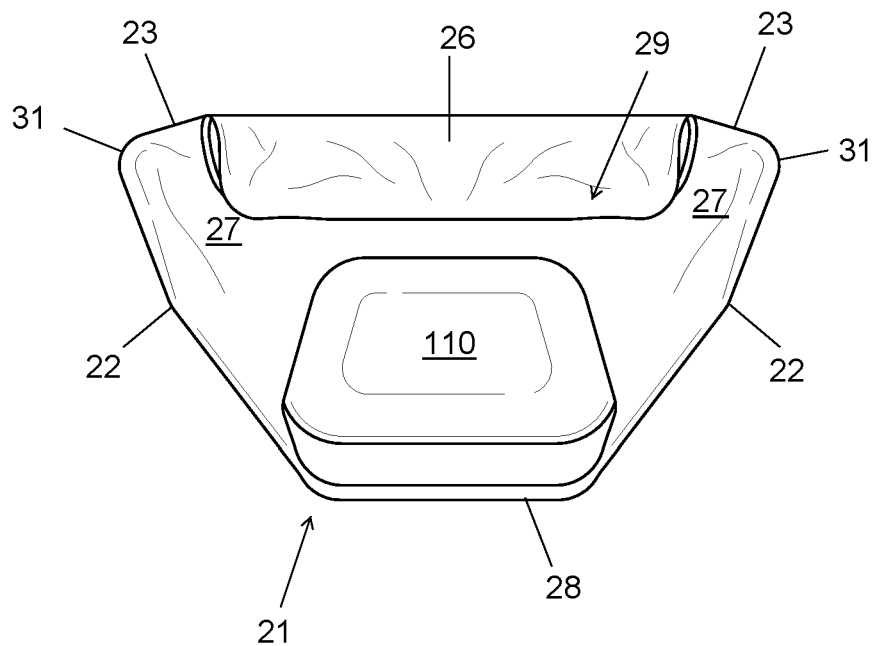

FIGS. 6 and 7 further illustrate the main body 20 in use on the collapsible support 50 of the travel support device 10. For clarity purposes the collapsible support 50 has been removed. In the preferred embodiments, the travel support device 10 may further comprises one or more removable pillows or cushions 110 for use with the device in situ as will be described in further detail below. The pillows 110 may be of different shapes and sizes, and are preferably an inflatable cushion or pillow 110. Largely, the inflatable pillow 110 is used to keep the recess 29 of the main body 20 open to maintain the three dimensional shape of the main body 20 on the support structure 50.

Referring to FIGS. 6 and 7, a first support form or structure of the main body 20 and the collapsible support structure 50 of the first preferred embodiment of the travel device 10 is shown. In the first support form, the device 10 comprises an open well or recess 29 configured to receive and retain a user's foot and/or leg 12 therein. The recess 29 comprises a floor and an inner peripheral wall for bounding the user's leg and/or foot 12 therein. The inner wall comprises at least a rear surface but preferably also include one or two side surfaces. In the preferred embodiment, the inner wall is composed of two lateral side walls 27 formed by the lateral wings 27, a rear wall 24 formed by the rear part 24 of the central body portion 21 of the front section and extending approximately orthogonally between the side walls 27. A floor 28 formed by the front part 28 of the central body portion 21 of the front section extends approximately orthogonally between the side walls and at a lower end of the rear wall 24. The side walls 27 and preferably also the rear wall 24 are of sufficient height in this three dimensional form of the body 20 to extend along at least a substantial portion of the user's lower leg 12 when a user's foot is resting on the floor. In FIG. 7 the user 11 would be resting their leg and/or feet 12 on the cushion 110. This provides support to the user's leg 12 as well as their foot enhancing support and increasing the range of possible comfortable seating positions.

The outer edge of each lateral side wall or wing 27 is shown with the attachment mechanism 30 formed by the pockets 30 which form the cavity for receiving the coupling devices 54 therein or attached on each arm 52 of the collapsible support 50. The attachment mechanism 30 associated with the wings/side walls 27 form an anchor by fixing the body 20 at either side of the formed recess 29 to the collapsible support structure 50 positioned in front of the user's seat 13. The main body 20 is suspended from the coupling devices 54 of the collapsible support 50. In this preferred form the front or anterior part of the recess 29 is substantially open at least adjacent the floor 28 to enable a user 11 to extend their foot and/or leg 12 beyond the recess 29 if desired. The front end of the recess 29 in the preferred embodiment is open from the floor 28 and up substantially along the entire height of the side walls or wings 27.

The general orientation of the recess 29 is preferably approximately orthogonal to the general orientation of the seating surface 15 of the user's seat 13 and/or along a plane substantially parallel to the floor 14 of the vehicle with the collapsible support structure 50 supported on the floor 14. The tail section 26 extends from the rear wall 24 of the recess 29 and is configured as shown in FIG. 6 to be extended and positioned for the user 11 to sit upon on the seating surface 15 of the user's seat 13. The tail section 26 extends along at least a portion of a seating surface 15 of a user's seat 13 in situ. When in this configuration the tail section 26 is preferably of a length sufficient to extend along a substantial part of the length of the seating surface 15 and of a width sufficient to extend across a substantial part of the width of the seating surface 15. The tail section 26 is configured to be fixed in position on the seat 13 to form a first anchoring region for the device 10 in situ. In this embodiment, the tail section 26 is configured to be fixed in position on the seat 13 by friction caused by the weight of a user 11 sitting on top of the tail section 26 and seat 13. Alternatively or in addition one or more attachment members may be provided to the tail section 26 for sufficiently fixing the tail section 26 in position relative to the seat 13. A second anchoring region for this embodiment is through the attachment of the main body 20 to the coupling device 54 of the collapsible support 50, with the collapsible support 50 supported or in frictional engagement with the floor 14.

Alternatively and as shown in FIG. 7 the tail section 26 extends from the rear wall 24 of the recess 29 and is configured as shown in FIG. 7 to be rolled up and placed in the rear of the recess 29.

Figure 8:
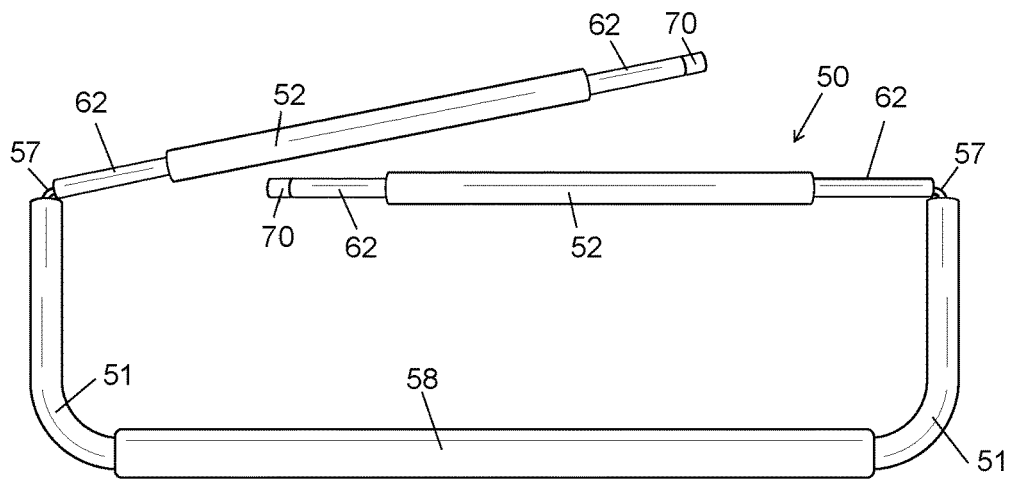
FIG. 8 shows a first embodiment of a self-deploying support structure in a storage configuration and in accordance with the present invention as shown in FIG. 1.
Figure 12:
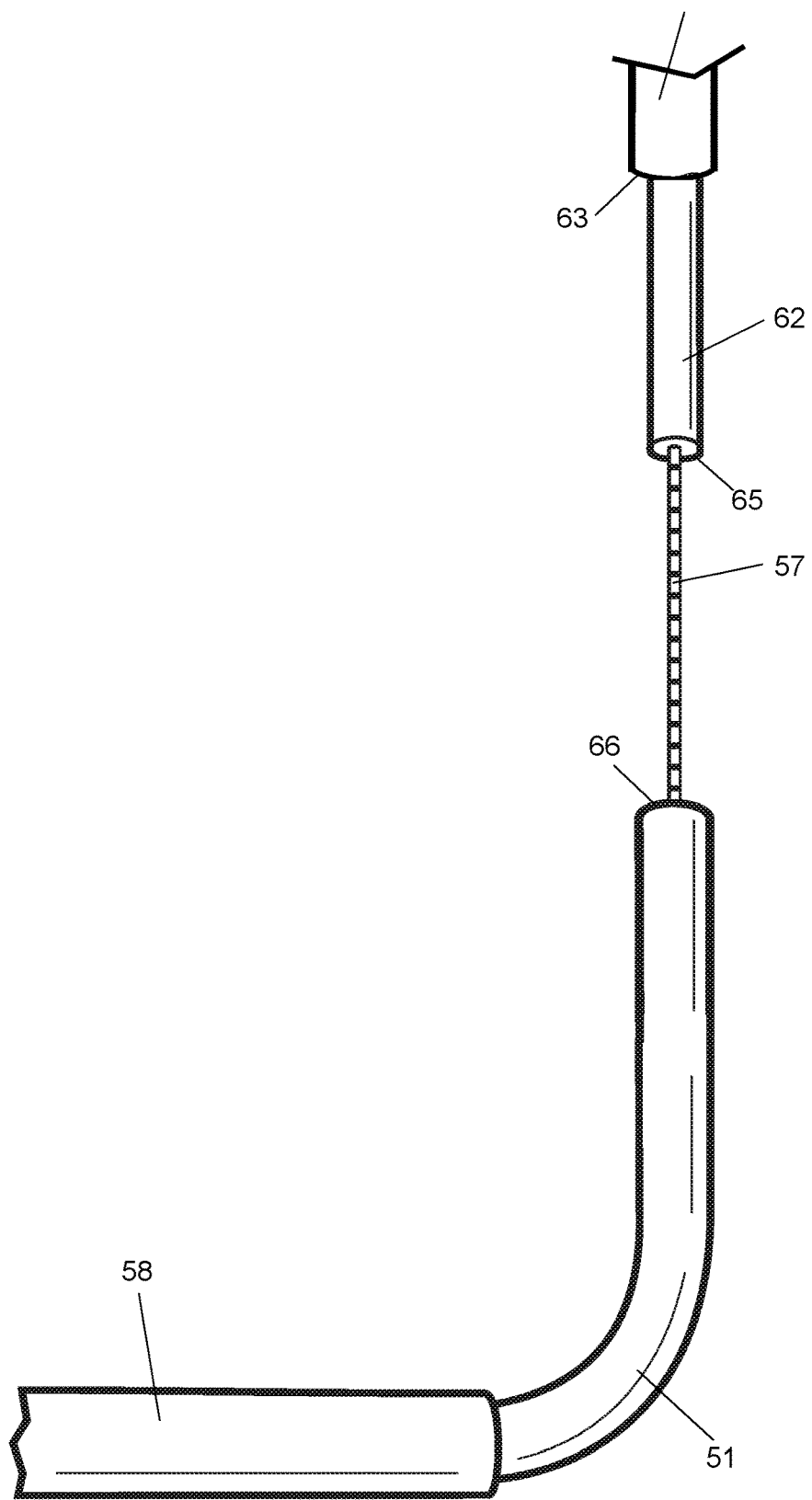
FIGS. 12 to 14 show a detailed view of the slip joint connectors of sections of the self-deploying support structure of FIGS. 8 and 9.
Figure 13:
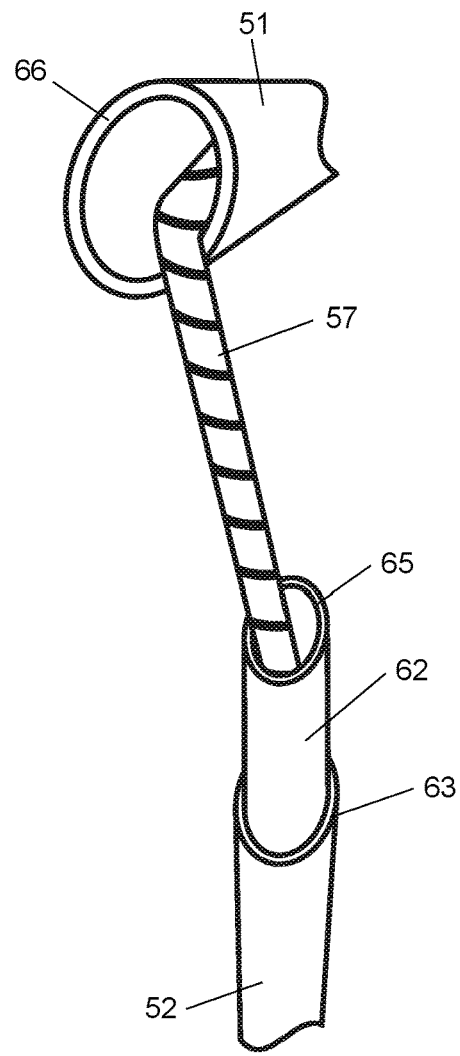
Figure 14:
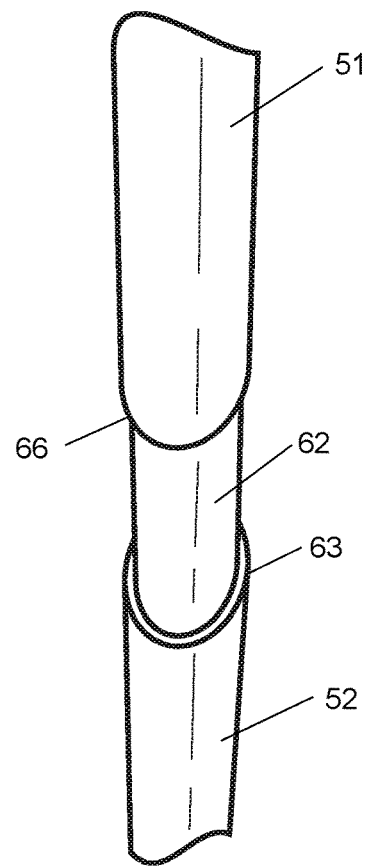

FIGS. 7 and 8 show a first embodiment of the collapsible support 50. FIG. 7 shows a partially collapsed view of the collapsible support 50 and FIG. 8 shows the erected or deployed view of the collapsible support 50 with the coupling members 54 in place on top of the sections 52 on either side of the base 51. FIGS. 12 to 14 illustrate close up views of the slip joint connectors between the sections 52, 54 and sections 51, 52 of the self-deploying support structure 50. Relative positions of various parts, portions and sections of this collapsible support 50 will now be described.

Referring to FIG. 7, the self-deploying support structure 50 generally comprises a base 51 and two side arms formed by the sections 52. The base 51 and the side arms are formed from a number of shaft sections 51, 52 each having a hollow core. Though the shafts 51, 52 in the figures are depicted as having a generally circular cross-section, other cross-sectional shapes may be utilised for the shafts 51, 52 without departing from the present disclosure. The shaft sections 52 have a straight shaft having a hollow core with a connector 62 at either end. The base 51 is formed as a U-shaped base formed from a single hollow core section 51, each end of the base 51 has a socket for receiving the connectors 62 of each side section 52. The base 51 has a non-slip coating or surface treatment 58 applied around the section 51. When in use, the non-slip coating 58 ensures that base 51 does not move or at least is frictionally engaged with the floor or underlying structure 14.

A flexible member or cord 57 is secured at both extreme ends of each side section 52 by a knot retaining member 70. The knot retaining member 70 is partially located within the end of the connector 62 of the section 52. As its name indicates, the primary purpose of the knot retaining member 70 is to retain a knotted end of the cord 57 therein. Effectively the cord 57 extends from the end of top section 52 on one side arm and through each hollow section 51, 52 to the end of the top section 52 on the other side arm. The cord 57 is a dynamic rope which has been adapted to exert tension on the deployed or erected unitary structure 50 to retain each section 51, 52 in a connected configuration during use and to be held together in a folded configuration with each section 51, 52 adjacent one another when the support structure 50 is not threadedly coupled. The self-deploying support structure 50 is transformable between a stored configuration where each of the sections 51, 52 is uncoupled and secured in a compact bundle and a deployed configuration where the connector ends 62 of each segment 51, 52 are mated to form the unitary structure of the support structure 50.

Figure 9:
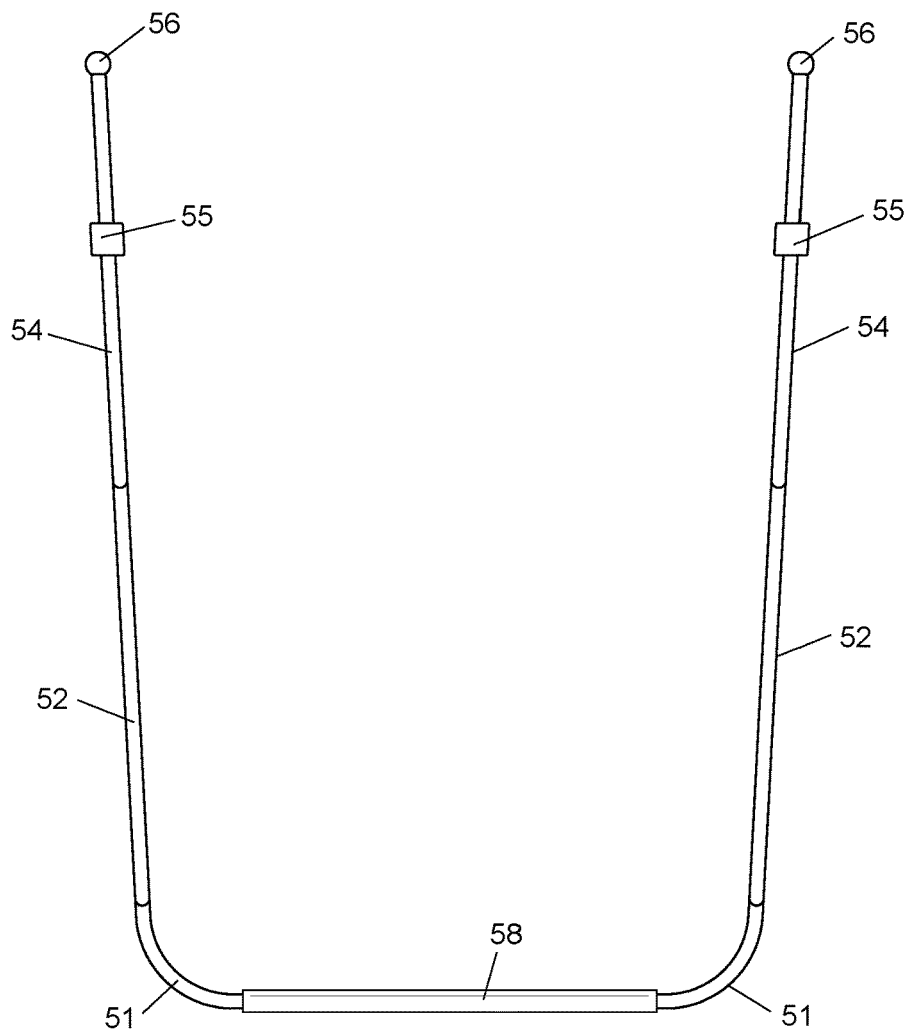
FIG. 9 shows the deployed self-deploying support structure with the coupling device attached to either end section of the U-shaped unitary structure.

As is illustrated in FIG. 7 each end of the section 52 has a connector 62 for forming a slip joint between adjacent sections 51, 52. The bottom connector 62 on each section 52 is mated within the adjacent end of the base 51. The opposing end connector 62 of each section 52 is mated with the adjacent connector on the coupling device 54 to form the unitary structure of the collapsible support structure 50 as shown in FIG. 9. Each connector 62 could be formed as either a socket (female) or a probe (male) mateable connector ends 62 respectively. Each connector end 62 being compatible with the connector end of the adjacent section 51 or coupling member 54 of the support structure 50. As shown in FIGS. 12 to 14 the connector ends 62 have a circular shape. However, other shaped ends are possible in particular, the connector ends 62 could be elliptically shaped which provides a strengthened joint between adjacent sections 51, 52 and also ensures that when connected the ends 62 will not slip or turn under stress. This provides a much stronger overall construction for the collapsible support structure 50 when in the deployed or erected configuration to form the unitary structure for the travel support device 10. While the connector ends 62 are illustrated as circular other shaped ends may be utilised for the connectors 62 without departing from the present disclosure. For example, the connector ends 62 could be elliptical, square or triangular shaped.

FIG. 12 shows the slip joint connection between the section 52 and the base 51. The diameter of the connector 62 is less than the outside diameter of the base section 51 such that when the connector 62 is inserted into the end of the base section 51 the end 66 of the base section 51 will abut against the end wall 63 of the section 52. As illustrated the cord 57 extends under tension through the section 52 and the base 51.

As shown in FIGS. 13 and 14 the connector ends 62 are formed at each end of the section 52 and mate with the end of the base 51 to form a slip joint. The connector end or probe 62 has a hollow end which adjoins with the hollow passing through the section 52 to form the section 52. The connector 62 has an end wall 65 which is part of the reduced diameter connector 62. The diameter of the connector 62 is less than the outside diameter of the base section 51 such that when the socket end of the base 51 is placed over the connector 62 the end wall 66 abuts against the wall 63 of the section 52 to join section 52 to the base 51. Both section 52 and the base 51 are retained under tension by the cord 57. As described above the circular shape of the end connectors 62 ensure that the section 52 when joined to either the base 51 or the coupling member 54 are able to easily rotate and move freely to form the slip joint connections. As shown in FIG. 14 the end connector 62 of the section 52 receives the socket of the base 51 to form part of the self-deployed support structure 50.

In a further embodiment of the collapsible support structure 50, each of the connector ends 62 include a magnet (not shown). The magnets are typically circular shaped, with the middle of the magnet defining an aperture through which the cord 57 passes. Magnets located in adjacent mateable ends of the coupling member 54 and the base 51 are arranged to have opposite polarity. Attraction between the opposite polarity magnets in the adjacent connector 62 assists in converting the support structure 50 from the stored configuration shown in FIG. 7 to the deployed configuration shown in FIG. 8.

Figure 10:
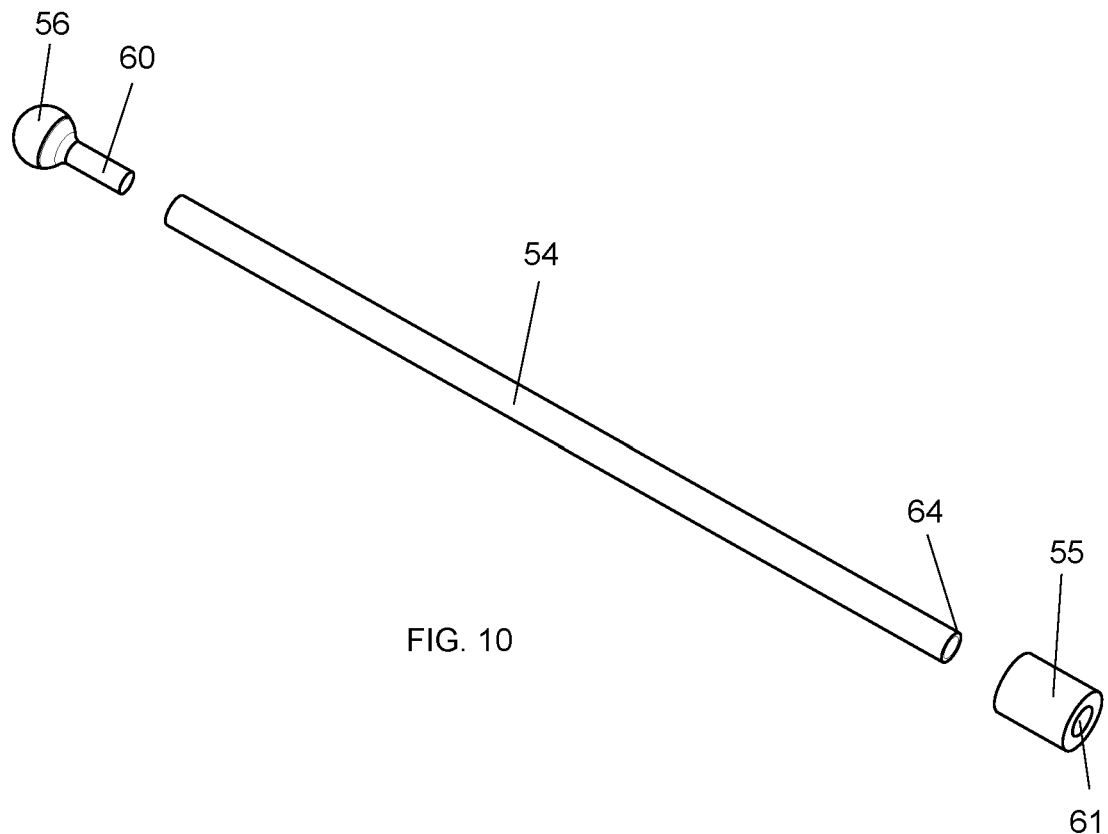
FIGS. 10 and 11 show perspective view of the coupling device in accordance with the present invention.
Figure 11:
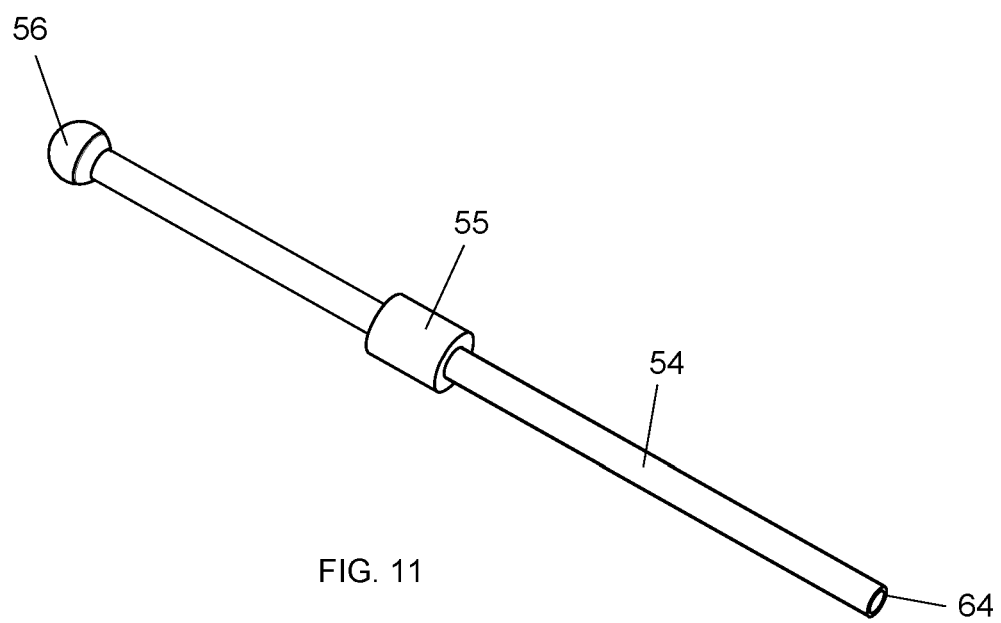

FIGS. 10 and 11 shows the coupling device 54 formed from a hollow shaft piece with the body engaging member 56 inserted in one end of the hollow shaft and the collar 55 spaced along the shaft from either end of the coupling device 54. As described above the end 64 of the coupling device 54 is inserted over the connector 62 to join the coupling member 54 to the support structure 50. The body engaging member 56 has a spherical end for abutting against the foam element 32 located within the attachment means 30 on each wing 27 of the main body 20. A connector 60 is attached to and extends away from the base of the body engaging member 56 which allows the body engaging member 56 to be inserted and retained within the end of the hollow shaft of the coupling member 54. The collar 55 has an aperture 61 which is approximately the same diameter as the outside diameter of the hollow shaft of the coupling member 54. The collar 55 can be slid along the shaft of the coupling member 54 and retained in place on the shaft by an adhesive. Likewise, the body engaging member 56 can also be retained within the end of the shaft of the coupling device 54 by an adhesive or the like. Alternatively, as both the collar 55 and the body engaging member 56 are formed of a plastics material they may be moulded in place on the shaft of the coupling member 54 by any known moulding process.

The coupling device 54 performs two tasks when coupled to the end section 52 on either side arm of the support structure 50. The body engaging member 56 is used to retain the terminal end 31 of the attachment mechanism 30 of the main body 20 in position in use. The spherical end of the body engaging member 56 may also have on its outer top end a non-slip coating applied to assist in retaining the body engaging member 56 in position in use. The collar 55 is adapted to retain the coupling member 54 within the pocket 30 of each wing 27. As previously described one side 33 of the pocket 30 has an opening with a resilient edge portion for receiving and retaining the collar 55 of the coupling element 54 therein. The resilient edge portion is expanded to allow the coupling member 54 to be inserted within the attachment mechanism 30 and then once inserted the resilient edge portion contracts around the end of the collar 55 to secure the coupling device 54 within the attachment mechanism 30. The resilient nature of the edge portion allows enough tension to be applied to and/or around the collar 55 to retain it in place.

Figure 15:
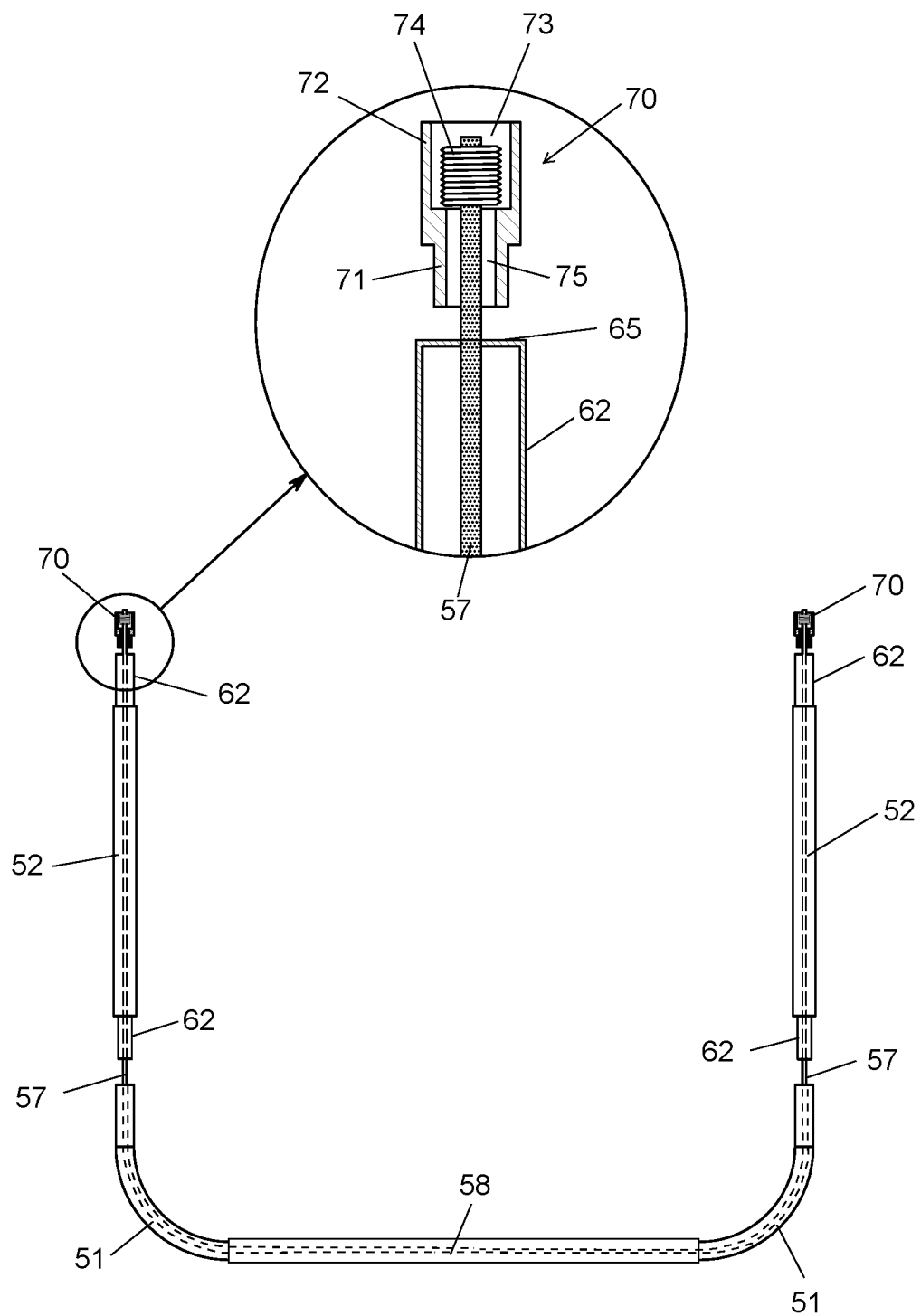
FIG. 15 shows an exploded view of the self-deploying support structure of FIG. 8 with a detailed view of the end retaining device for the end of the cord.

FIG. 15 shows an exploded view of the self-deploying support structure 50 and a detailed view of the knot retaining device 70 for securing the ends of the cord 57. As described above in FIG. 7 the flexible member or cord 57 is secured at both extreme ends of each side section 52 by the knot retaining member 70. The knot retaining member 70 is partially located within the end of the connector 62 of the section 52. The knot retaining member 70 is a cylindrical member formed from a plastics material and retains the knotted end of the cord 57 therein. A cylindrical first portion 72 is formed which has an outside diameter approximately the same as the outside diameter of the connector 62. The second cylindrical portion 71 has a smaller outer diameter so as to allow the end to be inserted into the connector 62 of the section 52. The larger diameter first portion 72 abuts the end 65 of the connector 62. The cylindrical second portion 72 has an internal bore 75 sized to allow the cord 57 to pass therethrough. Likewise the first cylindrical portion 72 has an internal bore 73 sized to allow a knotted end 74 of the cord 57 to be retained therein.

FIG. 16 shows an exemplary use of the travel support device 10 in accordance with an embodiment of the present invention. With a user 11 seated on seat 13 with the tail section 26 secured beneath the user 11 and the seating surface 15 the travel support device 10 is supported on the floor 14 by the base 51 of the collapsible support 50 and the users feet and/or legs 12 are positioned within the recess 29. The coupling device 54 is secured or sewn within the attachment mechanism or pocket 30 on each wing 27 of the main body 20. The body engaging member 56 of the coupling device 54 is in frictional contact with and abuts against the foam member 32 located within the pocket 30 and locates the internal surface of the terminal end 31 of the main body 20 in place for use. As shown the bottom of the coupling device 54 protrudes from the opening within one side 33 of the pocket 30. The bottom end of the coupling member 54 is attached to the end connector 62 of the section 52 of the support structure 50 to support the main body 20 on the support structure 50. As previously mentioned a further surface treatment or non-slip coating 58 is applied to the base 51 of the collapsible support 50 to provide frictional engagement with the floor 14 to prevent or at least reduce the forward movement of the collapsible support 50 in use.

A further support structure or seat 13 located forward of the seated user 11 has an arm 16 mounted to either side of the seat 13. As shown the front of the main body 20 and in particular the foam member 32 insert abuts against or is supported from the rear of the arm 16 or the seat 13. This ensures the user seated in front of the seat 11 in which the collapsible travel support device 10 is being used is in no way hampered and has ample arm movement available without restriction. The addition of the foam insert 32 inside the pocket 30 ensures that the coupling device 54 makes little or no noise if it hits against the rear end of the arm 16. This is particularly important on aircraft were there is a significant amount of vibration. Secondly it also provides a soft surface if contacted by the arm of the user seated in front of the seat 11 in which the collapsible travel support device 10 is being used.

Figure 17:
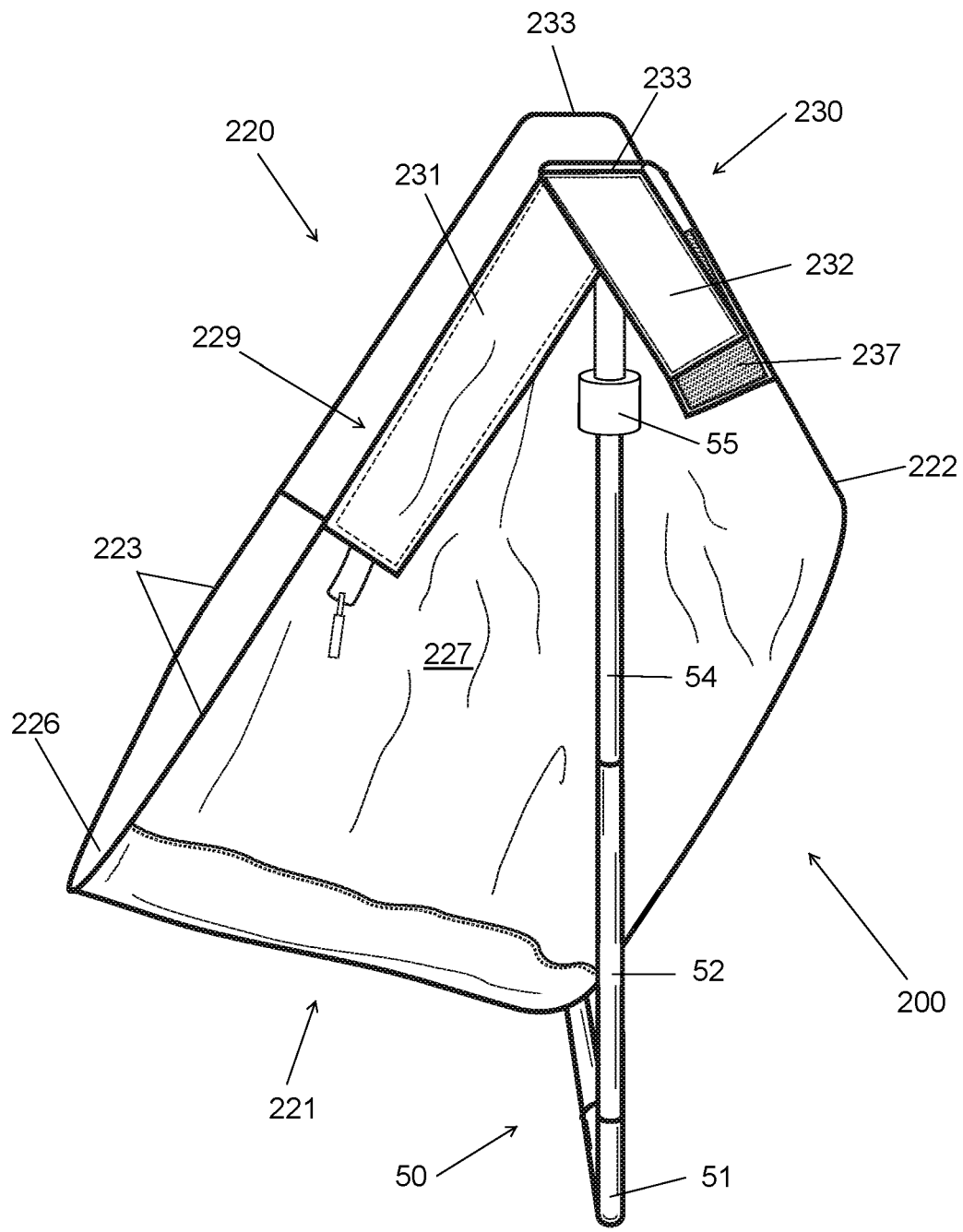
FIG. 17 shows a side view of the collapsible support device in accordance with a further embodiment of the present invention.

FIG. 17 shows the embodiment in which the coupling device 54 is not fixed or sewn into the attachment mechanism 230 of the main body 220. In this embodiment the coupling device 54 is attached to the end segment 52 of the unitary U-shaped support member 50. As shown the collar 55 of the coupling device 54 simply extends along beside each wing 227.

As will be described below in relation to FIGS. 18 to 21 the configuration of the support structure 50 allows for a further embodiment in which the attachment mechanism 230 positioned on each lateral wing 227 consists of two straps 231, 232, two attachment members 236, 237 and a central attaching member 233 joining the straps 231, 232 to each lateral wing 227 of the main body 220.

Figure 18:
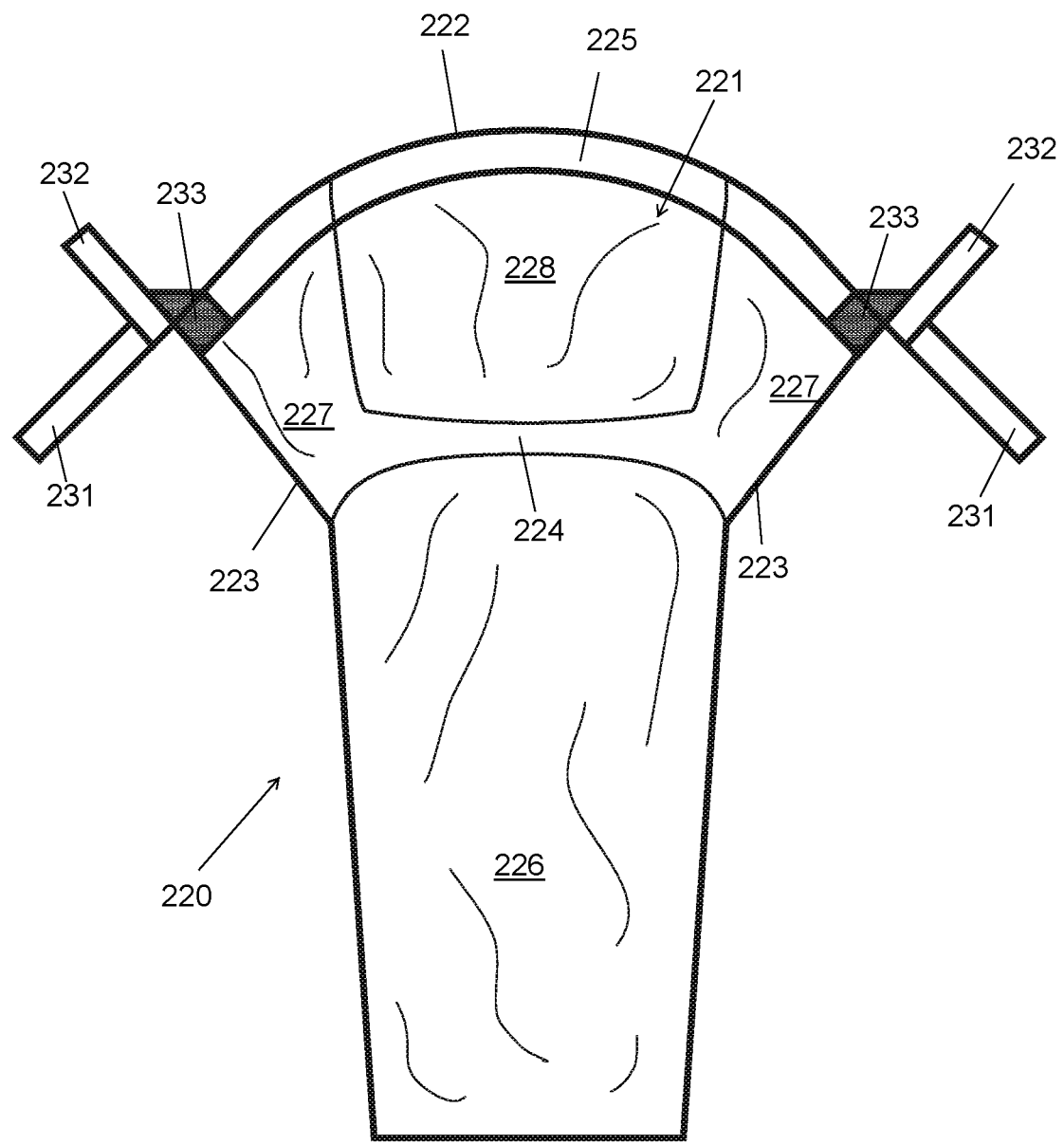
FIGS. 18 and 19 show front and rear plan views of a further embodiment of the main body of the collapsible support device as shown in FIG. 17.
Figure 19:
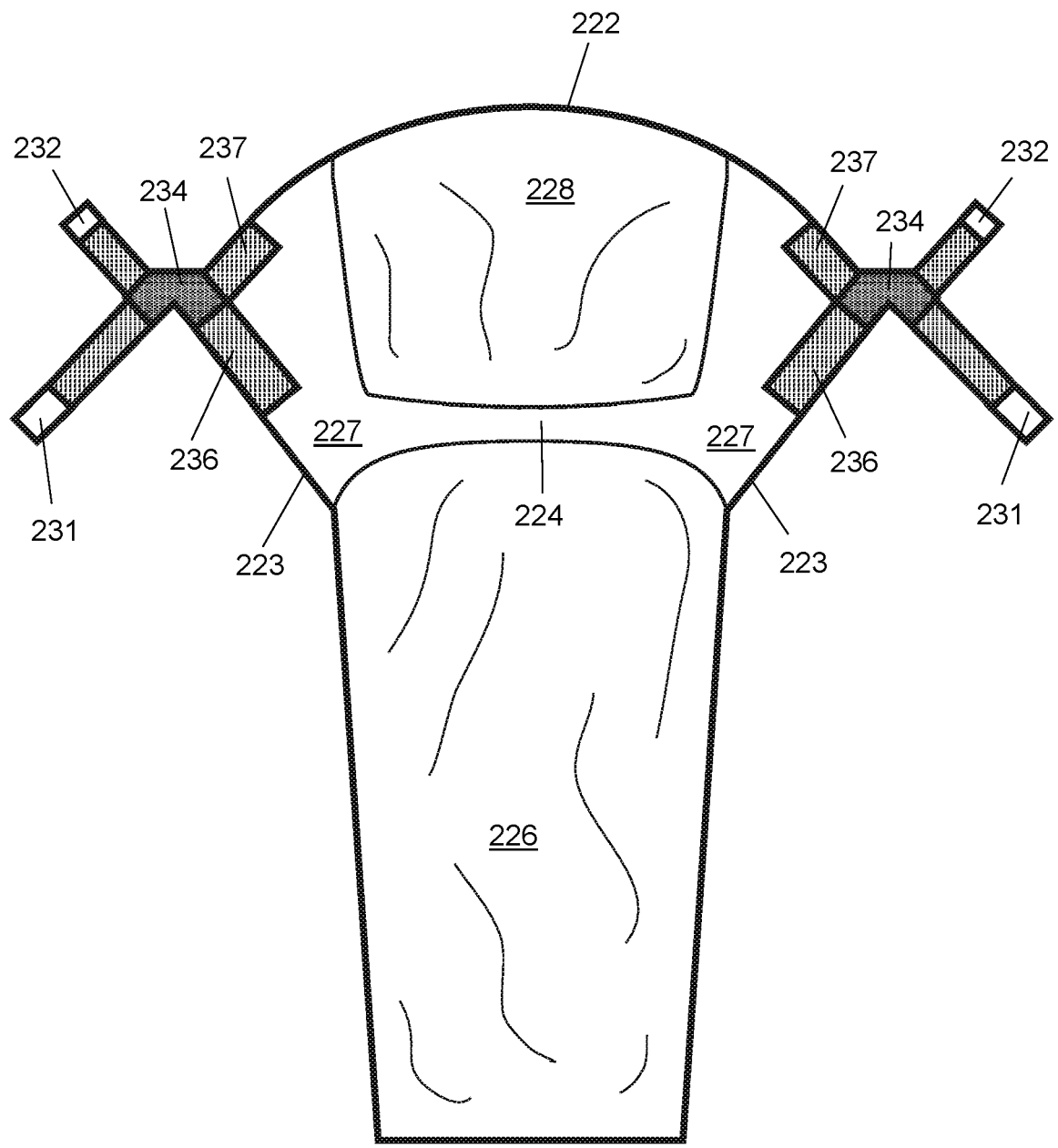

FIGS. 18 and 19 shows front and rear plan views of the main body 220 which is adapted to be supported upon a collapsible support structure 50. The flexible main body 220 of the collapsible travel support device 200 is shown in an unassembled or spread out state to illustrate the components of the main body 220. Relative positions of various parts, portions and sections of this main body 20 will now be described with reference to the substantially spread out state.

The main body 220 that is formed from one or more sheets of durable material to provide a body structure that can be manipulated to adjust a three dimensional form of the body for achieving a support structure in the assembled state. The main body 220 of the device 200 comprises a front section having a central body portion 221 and a pair of lateral wing portions 227 extending from either side of the central body portion 221, and a tail section 226 comprising a length of material extending longitudinally from a rear part 224 of the central body portion 221. The central body portion 221 comprises a front part 228 and a rear part 224. The tail section 226 extends from adjacent the rear part 224 of the central body portion 221. Any one or more of the portions, parts or sections described thus far may be integrally formed, or separately formed or cut and fixedly coupled to one another via sewing/stitching, adhesive or any other suitable coupling means.

The front section 221 is preferably of a greater width (at its widest region) than the tail section 226. The tail section 226 is preferably of a uniform width along its length and of a sufficient length to extend at least along a substantial portion of the sitting surface 15 of the users seat 13. It will be appreciated that in alternative embodiments the tail section 226 may be non-uniform in width along its length. In an assembled configuration as illustrated in FIG. 18 the main body 220 is approximately the width of the usable area of the vehicle seat, or approximately the width of the user's body.

Each wing portion 227 comprises a pair of outer edges 222 and 223. The first outer edge 222 extends obtusely from an outer leading edge of the front part 221 and the second outer edge 223 extends from a terminal end of the first edge 222 towards the tail section 226. The outer edges 222 and 223 are preferably approximately orthogonal to one another. Each outer edge 222 and 223 has one or more attachment members 236, 237 provided along at least a portion of the length of the edges 222, 223. Extending the length of the outer edge 222 and across the front section 221 is a reinforced section 225 which provides further strength across the open front of the main body 220 when in use.

The main body 220 has an attachment mechanism 230 positioned on each lateral wing 227 and consists of two straps 231, 232, two attachment members 236, 237 and a central attaching member 233 joining the straps 231, 232 to the lateral wing 227. The first attachment member 236 extends along the outer edge 223 and a second attachment member 237 extends along the outer edge 222 of each wing portion 227.

Figure 20:
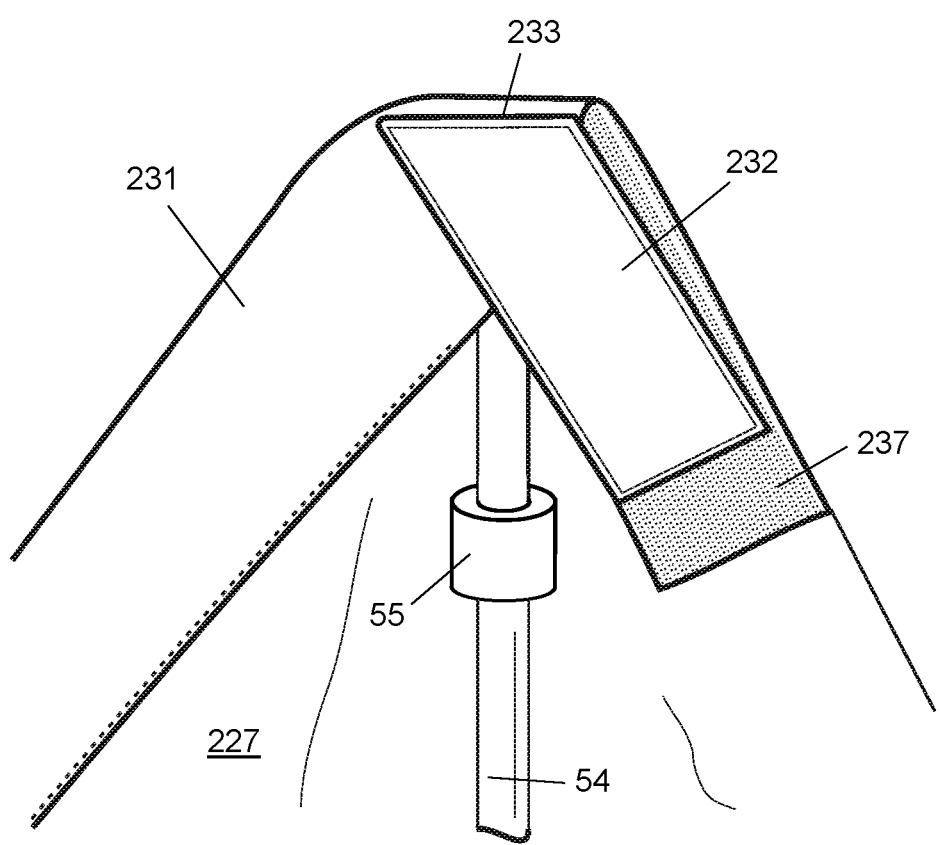
FIG. 20 shows a partial detailed side view of the collapsible support device of FIG. 17 with the main body of FIGS. 18 and 19 attached to the coupling device of the self deploying support structure.

Complementary attachment members in the form of straps 231, 232 extend from the outer edges 222, 223 and are joined to the outer edges by the central attaching member 233. In this embodiment the strap 231 releasably couples to the first attachment member 236, for each wing portion 227. Likewise the strap 232 is releasably attached to the attachment member 237. When the straps 231, 232 are folded around the central attaching member 233 and coupled to their respective attachment member 236, 237 the central attaching member forms a recess for receiving the coupling device 54 of the collapsible support member 50. The central attaching member 233 has an inner surface 234 to which a non-slip coating or fastener is applied to assist in retaining the end surface 66 of the body engaging member 56 of the coupling device 54 as shown in FIG. 20. The fastener applied to the end surface 66 and the corresponding inner surface 234 may be a hook and loop fastening system.

The first and second attachment members 236, 237 and straps 231, 232 are part of a hook and loop fastening system but may alternatively couple one another via any other suitable fastening mechanisms known in the art such as buckles, snap-fit engagements and the like. The first and second attachment members 236, 237 are preferably sewn onto the respective edges 221, 222 but may be coupled to the wings 227 in any other well-known manner. The complementary attachment member of the hook and loop fastening system is also preferably sewn onto each respective strap 231, 232 but may be coupled to the straps 231, 232 in any other well-known manner. Also as illustrated in FIG. 19 the complementary attachment member of the hook and loop fastening system on each respective strap 231, 232 do not extend to the end of the straps 231, 232. This provides the user 11 with a tab on each end of the straps 231, 232 to manipulate the straps 231, 232 between an open and closed position.

FIG. 20 shows the attachment of the main body 220 to the coupling device 54. The main body 220 can be manipulated into a three-dimensional form prior to placing the main body 220 on the coupling device 54. For example, the strap 231 can be manipulated into position on the attaching member 236 prior to the main body 220 being placed on coupling device 54. The body engaging member 56 of the coupling device 54 is then placed within the recess formed between the straps 231, 232 and the central attaching member 233 joining the wing 227. The strap 232 is folded back to allow the body engaging member 56 to be placed into the recess. FIG. 20 illustrates the closing of the strap 232 to be releasable engaged with the attachment member 237. This effectively secures the main body 220 to the support structure 50. With the body engaging member 56 positioned within the recess, the user 11 can position their legs and/or feet within the recess 229 of the three dimensional main body 220 while being self-supported upon the support structure 50.

Figure 21:
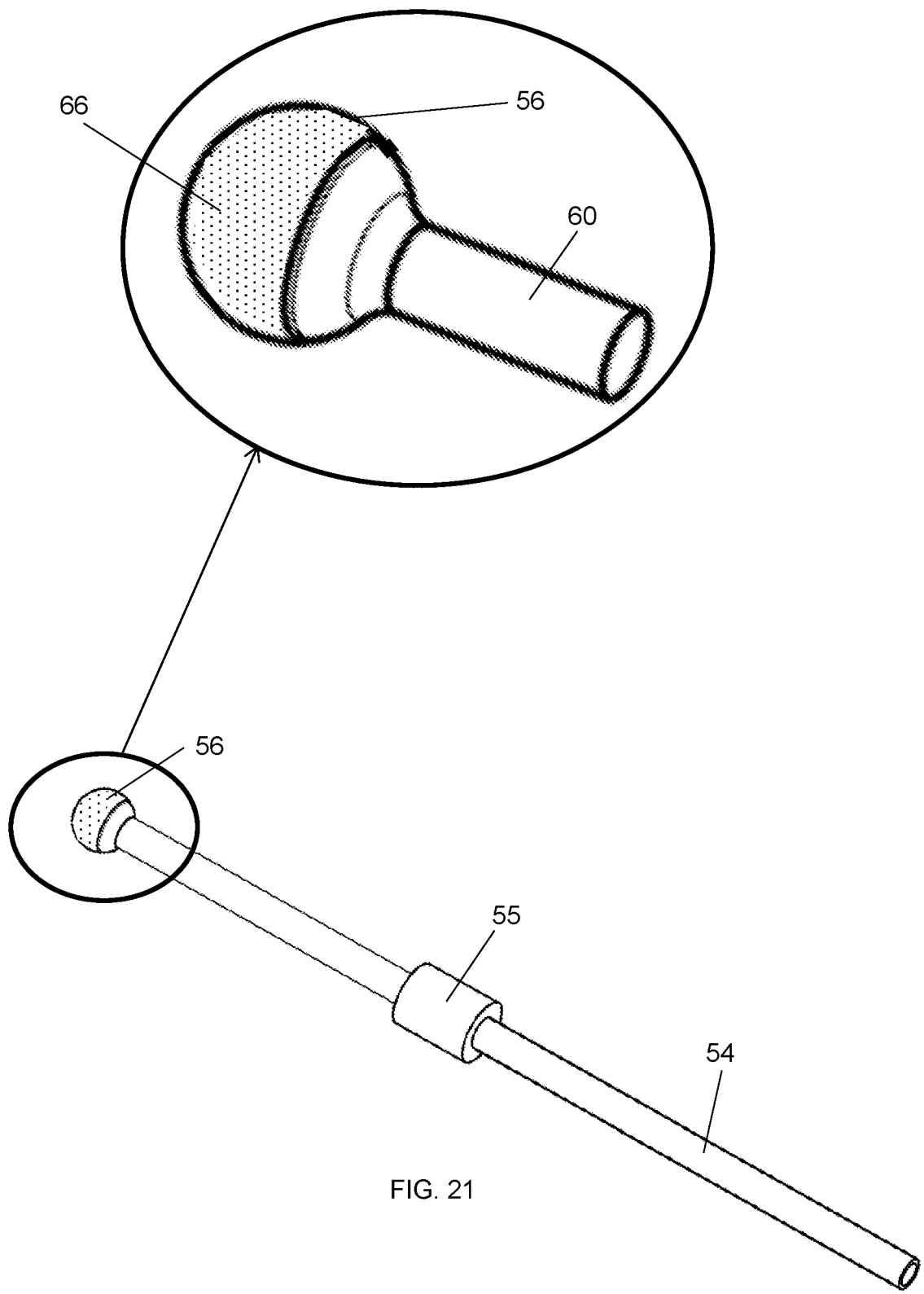
FIG. 21 shows the coupling device with an exploded view of the body engaging member of FIG. 20.

As described above the non-slip coatings or fasteners on the internal surface 234 of the recess on the main body 220 and on the external surface 66 of the body engaging member 56 of the coupling device 54 help to maintain the main body 220 in contact with the coupling device 54 in use. FIG. 21 shows the coupling device 54 and the body engaging member 56 which has the spherical end for abutting against the foam element 32 located within the attachment means 30 on each wing 27 of the main body 20. As illustrated the connector 60 is attached to and extends away from the base of the body engaging member 56 which allows the body engaging member 56 to be inserted and retained within the end of the hollow shaft of the coupling member 54. The spherical end of the body engaging member 56 has on its outer top end 66 to which a non-slip coating 66 is applied to assist in retaining the body engaging member 56 in position in use. As shown in FIGS. 17 and 20 the body engaging member 56 is located within the central attaching member 233 which has an inner surface 234 to which a corresponding non-slip coating is applied to assist in retaining the end surface 66 of the body engaging member 56 of the coupling device 54 in place in use. Alternatively, the anti-slip coatings could be replaced with corresponding hook and loop fasteners respectively.

Figure 22:
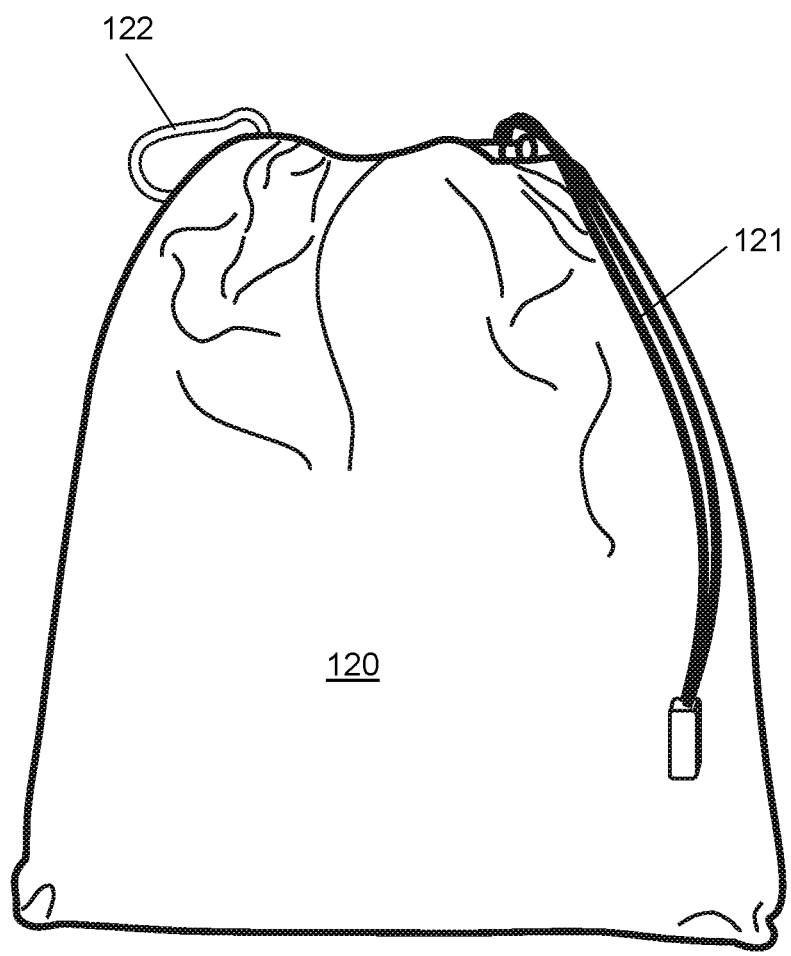
FIG. 22 illustrates a carry bag for the collapsible support device of the present invention.

FIG. 22 shows an exemplary bag or container 120 for placing the components of the collapsible travel support devices 10, 200 within for ease of transport. For example, the collapsible support structure 50 in a stored position along with the main body 20, 220 main be folded and placed into the storage bag 120. A drawstring or other closing device 121 is used to retain the components within the bag 120 and a quick release connecting device or clip 122 can also be provided to attach the bag 120 to some other component. For example, the bag 120 could be attached to a user's belt by the clip 122. The quick release connecting device 122 can also be attached to a piece of luggage or the like (not shown). In its transportable form the collapsible travel support device 10, 200 is light weight and compact and can be carried around easily. The one or more pillows 110 may also be deflatable and compactable to be retained within the same bag 120. As described above, the main body 20, 220 is preferably formed from a light weight, flexible and durable material. Accordingly, the main body 20, 220 may be rolled, folded or otherwise compacted to a substantially compact and portable size for transporting the device with ease in the bag 120.

Figure 23:
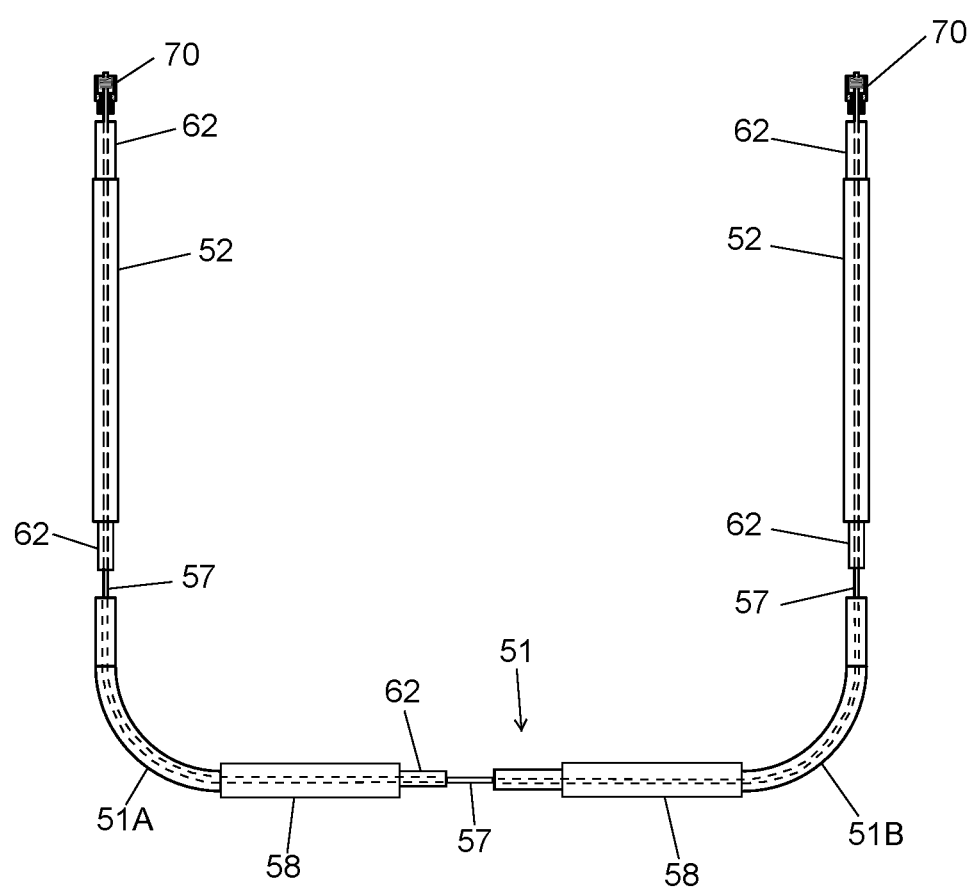
FIG. 23 shows an exploded view of a further embodiment of the self-deploying support structure.

FIG. 23 shows a further embodiment of the self-deploying support structure 50. As illustrated the base 51 is formed as a U-shaped base formed from two hollow core sections 51A, 51B with the cord 57 passing through both sections. The section 51A has a first end with a socket for receiving the connector 62 of the section 52 and a second end with the connector 62 for connecting to the adjacent socket in the end of the base section 51B. The section 51B has a first end with a socket for receiving the connector 62 of the section 52 on the opposite side of the U-shaped self-deploying support structure 50. In order to further reduce the size of the self-deploying support structure 50 when in the stored configuration the base 51 is split in two to form the sections 51A and 51B which are joined by a slip joint between the two sections 51A, 51B. The base sections 51A, 51B also has the non-slip coating or surface treatment 58 applied around each section 51A, 51B. When in use, the non-slip coating 58 ensures that base 51 does not move or at least is frictionally engaged with the floor or underlying structure 14.

As with the slip joint connections formed between coupling device 54 and the section 52 and the base section 51 and sections 52 the connectors are formed with a circular cross-sectional shape. However, other shaped ends are possible in particular, the connector ends 62 could be elliptically shaped which provides a strengthened joint between adjacent sections and also ensures that when connected the ends 62 will not slip or turn under stress. While the connector ends 62 are illustrated as circular other shaped ends may be utilised for the connectors 62 without departing from the present disclosure. For example, the connector ends 62 could be elliptical, square or triangular shaped. Likewise, the lengths, diameters, and cross-sectional size of the connectors 62 may vary in order to strengthen the self-deploying support structure 50.

In the preferred embodiments, the collapsible travel support devices 10, 200 may further comprise one or more removable pillows or cushions 110 for use with the device in situ. The pillows 110 may be of different shapes and sizes, and are preferably an inflatable cushion or pillow 110. The inflatable pillows 110 aid in keeping the shape of the recess 29, 229 in an open configuration which makes it easy for the user 11 to insert their legs and/or feet 12 within the recess 29, 229.

The pillow 110 also retains an open space so that the user 11 can move their legs 12 more freely when the device is in use. When more than one pillow 110 is placed within the recess 29, 229, a child could use the device 10, 200 as a bed. In this position the pillows 110 are substantially aligned with the height of the sitting surface 15 with the tail section 26, 226 placed on the sitting surface 15. The pillows 110 are preferably inflatable to adjust the size and/or softness of the pillow 110 as desired by the user 11. In some embodiments the pillow 110 may be securely fixed to the floor of the main body 20, 220 of the collapsible travel support device 10, 200.

In use, the floor and recess 29, 229 of the main body 20, 220 are suspended above the floor 14 of the vehicle in a majority of the adjustment positions by the attachment to the collapsible support 50. In one or more adjustment positions the floor of the main body 20, 220 may rest on the floor 14 of the vehicle. The adjustment positions may be discrete or continuous.

Typically, a user's foot and/or leg 12 lies on the pillow 110 or floor of the main body 20, 220 of the travel support device 10, 200. Due to the slight lifting of the foot or leg 12 off the ground, the user 11 is placed in a more comfortable seating position. Besides the positioning of the foot, the pillow 110 also relieves pressure from the bottom of the foot, enhancing user comfort. This is particularly appealing for travelers who spend extended periods of time sitting, for example on trains or planes. In addition to the comfort provided by the travel support device 10, 200 also reduces the swelling of the user's feet and legs. Sitting for extended periods can reduce blood flow in veins of the legs both due to constant pressure and reduced motility. Raising the legs 12 can reduce this pressure and therefore may reduce the risk of DVT.

To achieve the support form, the user 11 will first erect the collapsible support structure 50 by simply extending the sections 52 under tension of the cord 57 and allowing the respective male and female mateable connectors 62 to join adjacent sections to form the unitary structure of the collapsible support structure 50. With the coupling device 54 either in place within the attachment mechanism 30, 230 of the main body 20, 220 or alternatively attached to the end sections 52 on the end of each arm of the support structure 50, the support structure 50 is ready for the attachment of the main body 20, 220.

A user 11 can fold both lateral wings 27, 227 inwardly towards one another to an erect position where they are preferably substantially orthogonal to the front part of the central body portion 21, 221. As described above the main body 20, 220 can be attached to the coupling device 54 by one of three methods. If the coupling device 54 is sewn or attached to the pocket 30 of each wing 27 then it simply requires the end of the shaft of the coupling device 54 to be inserted into or over the connector 62 of the end section 52 of the support structure 50. If the coupling device 54 is not sewn into the wing 27 then it is inserted through the opening in one side 33 of the pocket 30 and removably retained therein and attached to the support structure 50 as above. Alternatively, the straps 231, 232 of the attachment mechanism 230 can be folded around the body engaging end 56 of the coupling device 54 and secured by the complementary attachment members 236, 237.

Once the main body 20, 220 is secured to the collapsible support structure 50 a user 11 can either roll up the tail section 26, 226 and place it in the rear of the recess 29, 229 or the tail section 26, 226 can be extended and placed on the sitting surface 15 of the seat 13 for the user 11 to sit on. The user 11 can then place their legs and/or feet 12 on or within the recess 29, 229 with the collapsible support structure 50 in a substantially upright orientation with the base 51 supported on the floor 14. One or more inflatable pillows 110 can be used for support and or comfort within the recess 29, 229. When used on an airplane the travel support device 10, 200 is supported away from the rear of the seat arm in front by the foam insert 32 located within the pocket 30 with the base 51 of the support structure 50 on the floor 14.

In order to dis-assemble and store the components of the collapsible travel support device 10, 200 the reverse of the above process is performed. The pillows 110 are removed and deflated and the main body 20, 220 is removed from the collapsible support structure 50. The pillow(s) 110 and the main body 20, 220 can be rolled, folded or otherwise compacted to a substantially compact and portable size for transporting with ease in the bag 120. If the coupling device 54 is sewn or fixed within each wing 27 then it is also rolled folded within the main body 20. Alternatively it is simply placed within the bag 120 with the other components. The collapsible support structure 50 is then transformed between the erected configuration and a stored configuration where each of the sections 52 and the base 51 are uncoupled and placed side by side in the stored position. The collapsed support structure 50 is then placed in the bag 120.

When the collapsible travel support device 10, 200 is used by children, the above setup and disassembly remain unchanged, however the recess 29, 229 can be filled with the pillows 110 to enable a child to lay across the seat 13 and the supported main body 20, 220. One or more pillows 110 may be provided within the recess 29, 229 to maintain a level structure for the child to rest upon.

It will be appreciated that in any of the embodiments described, the size of the main body 20, 220 is dependent on the application and one or more different sizes may be provided for different users, such as adults and children. The length and width of the attachment mechanisms 30, 230 may also vary depending on the size of the main body 20, 220 and/or application. In a children's version of the collapsible travel support device 10, 200 pillows 110 may be loaded into the recess 29, 229 to enable a child to lay across the seat 13 and the supported main body 20, 220. One or more pillows 110 may be provided within the recess 29, 229 to maintain a level structure for the child to rest upon.

The collapsible travel support device 10, 200 is light weight and flexible. This allows for easy maneuverability when in use and is therefore able to be set in many and varied positions that provide most comfort for the user 11 with very little effort.

The cord 57 of the collapsible support structure 50 is a dynamic rope or elastic rope specially constructed to provide a cord 57 which elongates under load. By way of example only, kernmantle ropes are the most common type of dynamic rope, and are typically manufactured from nylon for their durability and strength. The elastic cord 57 may be any one of a double-elastic nylon cord or double elastic tension cord, a shock cord, or a braided cord of cotton, nylon, polyester or polypropylene.

The size, cross-sectional shape, number of sections and material of the collapsible support structure 50 can also change without departing from the scope of the present disclosure. For example, the sections 52 and the base 51 could be made from aluminium, graphite-reinforced plastic or other fibre-reinforced plastic. In one embodiment, the shaft sections are constructed from 7075 aircraft grade aluminum tubing. The end connectors 62 of each section 52 may be any shape, however preferably the shape should provide an anti-rotation mechanism for each section 52 when in the deployed configuration. Preferably the end connectors of each section 52 are circular in cross-sectional shape. Likewise the hollow shaft of the coupling device 54 is likewise circular in cross-sectional shape.

The non-slip materials are all designed to provide frictional engagement between surfaces to retain or grip an item in place. The non-slip materials are typically in the form of a coating, sleeve or tape applied to each surface. The non-slip material is a rubber or plastics material with a textured finish providing a flexible material which it allows the material to flex and fit around the surface or component it is applied to. By way of example only, the non-slip material is similar to that used on motorcycle gloves and jackets which allow the rider to grip surfaces in all weather conditions. Alternatively, the non-slip material may be a surface treatment which is applied directly to an outer surface of the respective components. For example, the outer surface of the base 51 may have a knurled pattern applied which provides for the frictional engagement with the floor 14. As a further alternative the non-slip surface may be replaced by a fastener system such as hook and loop fastener system. For example, the end surface 66 of the coupling device 54 and the recess 234 within the cavity of the attachment mechanism 230 may have the respective hook and/or loop applied to secure the end of the coupling device 54 to the attachment mechanism 230 of the body 220.

Typically the main body 20, 220 is a sheet of durable fabric. The durable fabric sheet is made of a high tensile and sheer-strength flexible material such as canvas or nylon; many other suitable materials are known in the prior art, and any will work.

The body engaging member 56 and the collar 55 are a plastics material and may be moulded to the coupling device 54 by any known method. Alternatively, the body engaging member 56 and the collar 55 may be manufactured from the plastics material and then inserted onto or within the coupling device 54 and secured by an adhesive. Further alternatively, the body engaging member 56 and the collar 55 may be manufactured from a rubber material and then inserted onto or within the coupling device 54 and secured by an adhesive.

Advantages

A number of advantages are apparent in the present invention. It is light weight and flexible which allows for easy maneuverability when in use and is therefore able to be set in many and varied positions that provide most comfort for the user with very little effort.

The present invention provides a collapsible travel support device which can be used without attachment to any other structure other than the component parts of the device. The self-supporting collapsible support and the main body can be assembled and used without a physical attachment to any seat, or other structure. The collapsible support is placed on a floor or the like and the flexible main body is erected and supported on the collapsible structure. This has a number of advantages over the prior art. Firstly the device can be easily moved should an adjacent passenger need to alight from their seat, there is no physical attachment to any other component therefore removal or moving the device is quick and easy. The device is also positioned or spaced away from the rear of the forward seat or structure by the forward facing foam insert. This ensures that there is no restriction to movement for the person located in the forward seat, especially for their arms. The foam insert also reduces the noise which may be caused when metal surfaces knock against plastic surfaces, especially in high vibration environments like aircraft.

It is also able to be stored for transport quite easily. When folded and rolled in it transportable form it occupies very little space and can be stored in a small day pack or it can be attached to a user's clothing with ease. All components collapse into a relatively small footprint including the collapsible support structure which when the respective sections are uncoupled the device collapses to align each section in a side by side configuration. The collapsible travel support device also allows the user to easily change their position without affecting the structure of the device. For example, the user may place their feet and/or legs within the recess of the main body or they may place their legs across or on top of the device so that their legs and/or feet extend from the front of the open recess. The adjustable strap configurations make it ideal for use in a variety of seating positions. All of these features provide a universally useful foot and leg rest device for use providing comfortable seating.

When used by children the collapsible travel support device can be used as a bed. Pillows are placed within the recess such that the top surface of the pillows can be aligned at the same level as the seating surface upon which the child is placed.

Variations

It will be realized that the foregoing has been given by way of illustrative example only and that all other modifications and variations as would be apparent to persons skilled in the art are deemed to fall within the broad scope and ambit of the invention as herein set forth.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A collapsible seating support device for use in conjunction with a seat to support a user during a sitting position in situ, the collapsible seating; support device comprising:
   a main body of flexible material having a front section with a central body portion and a pair of lateral wings extending from either side of the central body portion, the main body is capable of being manipulated to alter a three dimensional form of the main body to form a recess for the user to rest the user's foot and/or leg therein;
   a self-deploying support structure having a pair of end sections and a base section, the pair of end sections and the base section comprising a shaft having a hollow core and first and second connector ends, the first and second connector ends forming a slip joint connection between adjacent sections, and a cord secured to opposing end sections of the self-deploying support structure and passing longitudinally through the pair of end sections and, the base section, and wherein the self-deploying support structure is transformable between a storage configuration where each of the pair of end sections and the base section is uncoupled and secured in a bundle, and a deployed configuration where the slip joint connections of the pair of end sections and the base each section are mated to form a unitary structure;
   a coupling device comprising a shaft having a hollow core and a first end spaced apart from a second end, the first end detachably connecting to the first connector end of each one of the pair of end sections of the self-deploying support structure, a body engaging member received within the second end and a collar spaced apart from the first and second ends of the shaft;
   an attachment mechanism associated with each lateral wing of the main body for attaching each respective lateral wing to the self-deploying support structure, each attachment mechanism comprises a pocket being secured at outer margins to each lateral wing, the pocket forming a cavity for receiving the coupling device and a foam element therein, the pocket having an opening with a resilient edge portion for access therein; and
   wherein when the body engaging member of the coupling device is received within the second end of the shaft it is adapted to abut the foam element within the pocket of the attachment means on each lateral wing and the collar is releasably retained by the resilient edge portion of the pocket on each lateral wing of the main body;
   wherein the main body and the self-deploying support structure are configured to form a self-supporting structure spaced apart from the seat in use and from a structure in front of the seat supporting the user.

2. A collapsible seating support device as claimed in claim 1, wherein the main body further comprises a tail section extending longitudinally from one end of the central body portion, the tail section is configured to either couple the main body to the seat via the user sitting on the tail section on the seat, or be contained in and along the one end of the central body portion in use.

3. A collapsible seating support device as claimed in claim 1, wherein each lateral wing comprises a pair of peripheral outer edges extending from the central body portion, and the pair of peripheral outer edges are formed approximately orthogonal to one another.

4. A collapsible seating support device as claimed in claim 3, wherein each pocket has a side secured along a portion of a length of the pair of peripheral outer edges thereof of each lateral wing, and a further side has the opening for access into the pocket, and the further side is partly secured to each lateral wing.

5. A collapsible seating support device as claimed in claim 4, wherein the opening in the further side of the pocket is sized to allow the insertion of the coupling device into the cavity of the pocket and the resilient edge portion is adapted to releasably retain the coupling device therein, and the cavity has a non-slip surface adapted to frictionally engage at least one surface of an end of the coupling device.

6. A collapsible seating support device as claimed in claim 1, wherein the cord is secured in each first connector end of each of the pair of end sections by a retainer device, the retainer device is adapted to be partially contained within the first connector end of each of the pair of end sections section of the self-deploying support structure.

7. A collapsible seating support device as claimed in claim 6, wherein the unitary structure formed by the deployed configuration of the self-deploying support structure is a U-shaped structure with the pair of end sections forming a pair of longitudinally extending legs extending from the base section, and the base section further comprises an outer surface adapted to be in frictional engagement with a surface upon which the base section of the self-deploying support structure is placed in use to enable the base section to be retained upon the surface.

8. A collapsible seating support device as claimed in claim 7, wherein the outer surface has a surface treatment which improves the frictional engagement of the base section with the surface upon which the base section of the self-deploying support structure is placed in use, and the surface treatment is a foam sleeve extending longitudinally and around the base section.

9. A collapsible seating support device as claimed in claim 8, wherein the base section further comprises a first base section and a second base section, the first and second base sections comprising a shaft having a hollow core and first and second connector ends, the first and second connector ends forming a slip joint connection between adjacent sections.

10. A collapsible seating support device as claimed in claim 1, wherein in use the collapsible seating support device is formed by coupling the first connector end of each one of the pair of end sections of the self-deploying support structure to the first end of the coupling device and located externally of the pocket on each lateral wing, wherein the coupling device is releasably retained by the resilient edge portion of the pocket on each lateral wing of the main body.

11. A collapsible seating support device as claimed in claim 1, wherein the body engaging member of the coupling device has a shaped end which abuts against the foam element within the pocket, and the body engaging member has a spherical shaped end.

12. A collapsible seating support device as claimed in claim 1, wherein the first end and the shaft of the coupling device, the first and second connector ends and the shafts of each of the pair of end sections and the base sections are all shaped so as to form slip joint connections when in the deployed configuration.

13. A collapsible seating support device as claimed in claim 12, wherein the first end and the shaft of the coupling device, the first and second connector ends of each of the pair of end sections the base section and the respective shafts of each section have a circular cross-sectional shape.

14. A collapsible seating support device as claimed in claim 1, wherein the first end of the coupling device, the first and second connector ends of each of the pair of end sections the base section are all shaped so as to securely retain and provide an anti-rotation mechanism for each section when in the deployed configuration.

15. A collapsible seating support device as claimed in claim 14, wherein the first end of the coupling device, the first and second connector ends of each of the pair of end sections the base sections have a cross-sectional shape in the form of any one of elliptical, square, hexagonal or triangular shape so as to be securely retained when in the deployed configuration.

16. A collapsible seating support device as claimed in claim 1, wherein the cord is any one of a dynamic rope, a kernmantle rope or an elastic cord, the cord is adapted to exert tension on the unitary structure to retain each of the pair of end sections and the base section in a connected configuration during use.

17. A collapsible seating support device as claimed in claim 1, wherein an anterior part adjacent a front section of the recess is substantially open to allow the user to extend the user's foot and/or leg beyond the recess of the main body of flexible material.

18. A collapsible seating support device as claimed in claim 17, wherein the main body is foldable, rollable or otherwise compactable and the collapsible seating support device further comprises a bag for retaining and transporting the main body and the self-deploying support structure therein.

19. A collapsible seating support device as claimed in claim 1, wherein the collapsible seating support device further comprises one or more removable inflatable pillows configured to be supported within the recess, and when placed within the recess of the main body, the one or more pillows aid in providing the three dimensional form of the recess for the user to rest the user's foot and/or leg therein.

20. A collapsible seating support device as claimed in claim 1, wherein the body engaging member and the collar of the coupling device are moulded plastic members formed on or placed on the shaft of the coupling device.

* * * * *